United States Patent
Sugiura et al.

(10) Patent No.: US 6,795,086 B1
(45) Date of Patent: *Sep. 21, 2004

(54) COLOR CONVERSION DEVICE AND COLOR CONVERSION METHOD

(75) Inventors: Hiroaki Sugiura, Tokyo (JP); Shuichi Kagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 412 days.

This patent is subject to a terminal disclaimer.

(21) Appl. No.: 09/689,600

(22) Filed: Oct. 13, 2000

(30) Foreign Application Priority Data

Oct. 14, 1999 (JP) .......................................... 11/291894

(51) Int. Cl.⁷ ............................................... G09G 5/02
(52) U.S. Cl. ........................ 345/600; 345/591; 345/604; 345/597; 382/162; 382/167
(58) Field of Search ............................. 345/591–3, 604, 345/600, 597; 358/535; 382/162, 167

(56) References Cited

U.S. PATENT DOCUMENTS

| | | | | |
|---|---|---|---|---|
| 5,107,332 A | * | 4/1992 | Chan ........................... | 358/518 |
| 5,588,050 A | * | 12/1996 | Kagawa et al. ................ | 217/37 |
| 5,809,213 A | * | 9/1998 | Bhattacharjya ............... | 358/1.6 |
| 6,434,268 B1 | * | 8/2002 | Asamura et al. ............. | 382/162 |
| 6,621,497 B1 | * | 9/2003 | Sugiura et al. .............. | 345/600 |

* cited by examiner

Primary Examiner—Matthew C. Bella
Assistant Examiner—Antonio Caschera
(74) Attorney, Agent, or Firm—Birch, Stewart, Kolasch & Birch, LLP

(57) ABSTRACT

After applying gray scale conversion to image data of three colors, six hue data are obtained, and then first comparison-result data and second-order terms each relating to one of the six hues, and second comparison-result data each relating to one of the six inter-hue areas are obtained. Matrix calculation is performed on the first comparison-result data, the second comparison-result data, and the second-order terms, using coefficients. By varying the coefficients, adjustment can be made to only the target hue or inter-hue area, without affecting other hues and inter-hue areas. Thus, the six hues and six inter-hue areas can be varied independently, and the large-capacity memory is not required. Moreover, by the use of the gray scale conversion, the effects of the non-linear characteristics of the input signals are removed.

22 Claims, 20 Drawing Sheets

| IDENTIFICATION CODE S1 | MAXIMUM VALUE $\beta$ | MINIMUM VALUE $\alpha$ | HUE DATA OF A VALUE ZERO |
|---|---|---|---|
| 0 | Ri | Gi | g,c |
| 1 | Ri | Bi | b,c |
| 2 | Gi | Ri | r,m |
| 3 | Gi | Bi | b,m |
| 4 | Bi | Ri | r,y |
| 5 | Bi | Gi | g,y |

\* r=Ri-$\alpha$, g=Gi-$\alpha$, b=Bi-$\alpha$
y=$\beta$-Bi, m=$\beta$-Gi, c=$\beta$-Ri

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

FIG. 10A

| HUE | EFFECTIVE FIRST COMPARISON-RESULT DATA |
|---|---|
| RED | h1r |
| GREEN | h1g |
| BLUE | h1b |
| CYAN | h1c |
| MAGENTA | h1m |
| YELLOW | h1y |

FIG. 10B

| INTER-HUE AREA | EFFECTIVE SECOND COMPARISON-RESULT DATA |
|---|---|
| RED-YELLOW | h2ry |
| YELLOW-GREEN | h2gy |
| GREEN-CYAN | h2gc |
| CYAN-BLUE | h2bc |
| BLUE-MAGENTA | h2bm |
| MAGENTA-RED | h2rm |

COLOR CONVERSION DEVICE AND COLOR CONVERSION METHOD

BACKGROUND OF THE INVENTION

The present invention relates to data processing used for a full-color printing related equipment such as a printer, a video printer, a scanner or the like, an image processor for forming computer graphic images or a display device such as a monitor. More specifically, the invention relates to a color conversion device and a color conversion method for performing color conversion from image data in the form of a first set of three color data of red, green and blue, or cyan, magenta and yellow, to a second set of three color data of red, green and blue, or cyan, magenta and yellow.

Color conversion in printing is an indispensable technology for compensating deterioration of image quality due to color mixing property due to the fact that the ink is not of a pure color, or the non-linearity (in the hue) of the image-printing, and to output a printed image with a high color reproducibility. Also, in a display device such as a monitor or the like, color conversion is performed in order to output (display) an image having desired color reproducibility in accordance with conditions under which the device is used or the like when an inputted color signal is to be displayed.

Conventionally, two methods have been available for the foregoing color conversion: a table conversion method and a matrix calculation method.

A representative example of the table conversion method is a three-dimensional look-up table method, in which the image data represented by red, green and blue (hereinafter referred to as R, G, and B) are input, to output an image data of R, G, and B stored in advance in a memory, such as a ROM, or complementary color data of yellow, cyan and magenta (hereinafter referred to as Y, M, and C). Because any desired conversion characteristics can be achieved, color conversion with a good color reproducibility can be performed.

However, in a simple structure for storing data for each combination of image data, a large-capacity memory of about 400 Mbit must be used. For example, even in the case of a compression method for memory capacity disclosed in Japanese Patent Kokai Publication No. S63-227181, memory capacity is about 5 Mbit. Therefore, a problem inherent in the table conversion system is that since a large-capacity memory is necessary for each conversion characteristic, it is difficult to implement the method by means of an LSI, and it is also impossible to deal with changes in the condition under which the conversion is carried out.

On the other hand, in the case of the matrix calculation method, for example, for obtaining printing data of Y, M and C from image data of R, G and B, the following formula (11) is used as a basic calculation formula.

$$\begin{bmatrix} Y \\ M \\ C \end{bmatrix} = (Aij) \begin{bmatrix} R \\ G \\ B \end{bmatrix} \quad (11)$$

Here, Aij represents coefficients, with i=1 to 3, and j=1 to 3.

However, by the simple linear calculation of the formula (11), it is impossible to provide a good conversion characteristic because of a non-linearity of an image-printing or the like.

A method has been proposed for providing a conversion characteristic to improve the foregoing characteristic. This method is disclosed in Japanese Patent Application Kokoku Publication H2-30226, directed to a color correction calculation device, and employs a matrix calculation formula (12) below.

$$\begin{bmatrix} Y \\ M \\ C \end{bmatrix} = (Dij) \begin{bmatrix} R \\ G \\ B \\ R*G \\ G*B \\ B*R \\ R*R \\ G*G \\ B*B \\ N \end{bmatrix} \quad (12)$$

Here, N is a constant, i=1 to 3, and j 1 to 10.

In the foregoing formula (12), since image data having a mixture of an achromatic component and a color component is directly used, mutual interference occur in computation. In other words, if one of the coefficients is changed, influence is given to the components or hues other than the target component or hue (the component or hue for which the coefficient is changed). Consequently, a good conversion characteristic cannot be realized.

A color conversion method disclosed in Japanese Patent Application Kokai Publication H7-170404 is a proposed solution to this problem. FIG. 20 is a block circuit diagram showing the color conversion method for conversion of image data of R, G and B into printing data of C, M and Y, disclosed in Japanese Patent Application Kokai Publication H7-170404. In the drawing, reference numeral 100 denotes a complement calculator; 101, a minimum and maximum calculator; 102, a hue data calculator; 103, a polynomial calculator; 104, a matrix calculator; 105, a coefficient generator; and 106, a synthesizer.

Next, the operation will be described. The complement calculator 100 receives image data R, G and B, and outputs complementary color data Ci, Mi and Yi which have been obtained by determining 1's complements.

The determination of 1's complement of an input data can be achieved by subtracting the value of the input data of n bits (n being an integer) from $(2^n-1)$. For example, in the case of 8-bit data, the value of the input data is deducted from "255".

The minimum and maximum calculator 101 outputs a maximum value $\beta$ and a minimum value $\alpha$ of this complementary color data and an identification code S for indicating, among the six hue data, data which are zero.

The hue data calculator 102 receives the complementary color data Ci, Mi and Yi and the maximum and minimum values $\beta$ and $\alpha$, and outputs six hue data r, g, b, y, m and c which are obtained by executing the following subtraction:

$r=\beta-Ci$, $g=\beta-Mi$, $b=\beta-Yi$, $y=Yi-\alpha$, $m=Mi-\alpha$, and $c=Ci-\alpha$, Here, among the six hue data, at least two assume the value zero.

The polynomial calculator 103 receives the hue data and the identification code S, selects, from r, g and b, two data Q1 and Q2 which are not zero and, from y, m and c, two data P1 and P2 which are not zero. Based on these data, the polynomial calculator 103 computes polynomial data:

$T1=P1*P2,$ $T3=Q1*Q2,$ $T2=T1/(P1+P2),$ and $T4=T3/(Q1+Q2),$ and then outputs the results of the calculation.

It is noted that asterisks "*" are sometimes used in this specification to indicate multiplication.

The coefficient generator 105 generates calculation coefficients U(Fij) and fixed coefficients U(Eij) for the polynomial data based on information of the identification code S. The matrix calculator 104 receives the hue data y, m and c, the polynomial data T1 to T4 and the coefficients U, and outputs the result of the following formula (13) as color ink data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} \quad (13)$$

The synthesizer 106 adds together the color ink data C1, M1 and Y1 and data a which is the achromatic data, and outputs printing data C, M and Y. Accordingly, the following formula (14) is used for obtaining printing data.

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} + \begin{bmatrix} \alpha \\ \alpha \\ \alpha \end{bmatrix} \quad (14)$$

The formula (14) shows a general formula for a group of pixels.

FIG. 21A to FIG. 21F, which are schematic diagrams, show relations between six hues of red (R), green (G), blue (B), yellow (Y), cyan (C) and magenta (M), and hue data y, m, c, r, g and b. As shown, each hue data relates to three hues (i.e., extends over the range of three hues). For instance the hue data c relates to the hues g, c and b.

FIG. 22A to FIG. 22F, which are schematic diagrams, show relations between the six hues and product terms y*m, r*g, c*y, g*b, m*c and b*r.

As shown, each of the six product terms y*m, m*c, c*y, r*g, g*b and b*r in the formula (14) relates to only one hue among the six hues of red, blue, green, yellow, cyan and magenta. That is, only y*m is an effective product term for red; m*c for blue; c*y for green; r*g for yellow; g*b for cyan; and b*r for magenta.

Also, each of the six fraction terms y*m/(y+m), m*c/(m+c), c*y/(c+y), r*g/(r+g), g*b/(g+b) and b*r/(b+r) in the formula (14) relates to only one hue among the six hues.

As apparent from the foregoing, according to the color conversion method shown in FIG. 20, by changing coefficients for the product terms and the fraction terms regarding the specific hue, only the target hue can be adjusted without influencing other hues.

Each of the foregoing product terms is determined by a second-order computation for chroma, and each of the fraction terms is determined by a first-order computation for chroma. Thus, by using both of the product terms and the fraction terms, the non-linearity of an image-printing for chroma can be adjusted.

However, this color conversion method cannot satisfy a certain desire. That is, depending on the user's preference, if an area in a color space occupied by specific hues is to be expanded or reduced, e.g., specifically, if expansion or reduction in an area of red in a color space including magenta, red and yellow is desired, the conventional color conversion method of the matrix computation type could not meet such a desire.

The problems of the conventional color conversion method or color conversion device are summarized as follows. Where the color conversion device is of a table conversion method employing a memory such as ROM, a large-capacity memory is required, and a conversion characteristic cannot be flexibly changed. Where the color conversion device is of a type using a matrix calculation method, although it is possible to change only a target hue, it is not possible to vary the color in the inter-hue areas between adjacent ones of the six hues of red, blue, green, yellow, cyan and magenta, and good conversion characteristics cannot be realized throughout the entire color space. Moreover, with the matrix conversion method shown in FIG. 20, when the image data input to color conversion device has a non-linear gray scale characteristics due to gamma correction processing, or highlight compression, the effect of the color conversion is influenced according to the level of the input image data.

SUMMARY OF THE INVENTION

The present invention was made to solve the foregoing problems.

An object of the present invention is to provide a color conversion device and a color conversion method for performing color-conversion wherein independent adjustment is performed not only for six hues of red, blue, green, yellow, cyan and magenta but also six inter-hue areas of red-yellow, yellow-green, green-cyan, cyan-blue, blue-magenta and magenta-red, and a conversion characteristic can be flexibly changed, and a good conversion can be achieved without being influenced by the non-linearity of the input image data, and no large-capacity memories are necessary.

According to a first aspect of the invention, there is provided a color conversion device for performing pixel-by-pixel color conversion from a first set of three color data representing red, green and blue, or cyan, magenta and yellow, into a second set of three color data representing red, green and blue, or cyan, magenta, and yellow, said device comprising:

gray scale conversion means for converting the gray scale of said first set of three color data to produce a third set of three color data representing red, green and blue, or cyan, magenta, and yellow;

first calculation means for calculating a minimum value $\alpha$ and a maximum value $\beta$ of said third set of three color data for each pixel;

hue data calculating means for calculating hue data r, g, b, y, m and c based on said third set of three color data, and said minimum and maximum values $\alpha$ and $\beta$ outputted from said calculating means;

means for generating first comparison-result data based on the hue data outputted from said hue data calculating means;

means for generating second comparison-result data based on said first comparison-result data;

coefficient generating means for generating specified matrix coefficients for the hue data, the first comparison-result data and the second comparison-result data; and second calculation means responsive to said hue data, said first comparison-result data, said second comparison-result data, and the coefficients from said coefficient generating means for calculating said second set of three color data, said second calculation means performing calculation including matrix calculation performed at least on said hue data, said first comparison-result data, said second comparison-result data, and the coefficients from said coefficient generating means.

Since the third set of three color data is obtained by gray scale conversion of the first set, of three color data, the third set are of the same combination of colors as the first set. That is, if the first set comprises red, green and blue, the third set also comprises red, green and blue. If the first set comprises cyan, magenta and yellow, the third set also comprises cyan, magenta and yellow.

With the above arrangement, it is possible to independently vary not only the colors of the six hues of red, blue, green, yellow, cyan and magenta, but also the colors in the six inter-hue areas of red-yellow, yellow-green, green-cyan, cyan-blue, blue-magenta, and magenta-red, without being influenced by the non-linearity of the input signals. Accordingly, it is possible to obtain color conversion methods or color conversion devices which can change the conversion characteristics flexibly, without requiring a large-capacity memory.

It is noted that the gray scale conversion means can be realized by a one-dimensional look-up table, and its size is much smaller than the three-dimensional look-up table.

Moreover, because the second comparison-result data calculated from the first comparison-result data are used as calculation term relating to the inter-hue areas in the matrix calculation, the number of calculation steps required can be reduced than if they are calculated from the hue data r, g, b, y, m, c.

It may be so configured that said second calculation means performs said matrix calculation on said hue data, said first comparison-result data, said second comparison-result data, and the coefficients from said coefficient generating means, and further includes synthesizing means for adding said minimum value $\alpha$ from first calculation means to the results of said matrix calculation.

It may be so configured that said coefficient generating means generates predetermined matrix coefficients Eij (i=1 to 3, j=1 to 3), and Fij (i=1 to 3, j=1 to 12), and said second calculation means performs the calculation using the hue data, said said first comparison-result data, said second comparison-result data, said minimum value $\alpha$ from said calculating means, and said matrix coefficients to determine the third set of three color data representing red, green and blue, denoted by Ro, Go and Bo, in accordance with the following formula (1):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (1)$$

wherein h1r, h1g, h1b, h1c, h1m and h1y denote said first comparison-result data, and h2ry, h2rm, h2gy, h2gc, h2bm and h2bc denote said second comparison result data.

It may be so configured that said coefficient generating means generates predetermined matrix coefficients Eij (i=1 to 3, j=1 to 3), and Fij (i=1 to 3, j=1 to 12), and said second calculation means performs the calculation using the hue data, said said first comparison-result data, said second comparison-result data, said minimum value $\alpha$ from said calculating means, and said matrix coefficients to determine the third set of three color data representing cyan, magenta and yellow denoted by Co, Mo and Yo, in accordance with the following formula (2):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (2)$$

wherein h1r, h1g, h1b, h1c, h1m and h1y denote said first comparison-result data, and h2ry, h2rm, h2gy, h2gc, h2bm and h2bc denote said second comparison result data.

It may be so configured that said second calculation means performs said matrix calculation on said hue data, said first comparison-result data, said second comparison-result data, the coefficients from said coefficient generating means, and said minimum value $\alpha$ from said first calculation means.

It may be so configured that
said coefficient generating means generates predetermined matrix coefficients Eij (i=1 to 3, j=1 to 3), and Fij (i=1 to 3, j=1 to 13), and said second calculation means performs the calculation using the hue data, said said first comparison-result data, said second comparison-result data, said minimum value α from said calculating means, and said matrix coefficients to determine the third set of three color data representing red, green and blue, denoted by Ro, Go and Bo, in accordance with the following formula (3):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (3)$$

wherein h1r, h1g, h1b, h1c, h1m and h1y denote said first comparison-result data, and h2ry, h2rm, h2gy, h2gc, h2bm and h2bc denote said second comparison result data.

It may be so configured that
said coefficient generating means generates predetermined matrix coefficients Eij (i=1 to 3, j=1 to 3), and Fij (i=1 to 3, j=1 to 13), and
said second calculation means performs the calculation using the hue data, said said first comparison-result data, said second comparison-result data, said minimum value α from said calculating means, and said matrix coefficients to determine the third set of three color data representing cyan, magenta and yellow denoted by Co, Mo and Yo, in accordance with the following formula (4):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (4)$$

wherein h1r, h1g, h1b, h1c, h1m and h1y denote said first comparison-result data, and h2ry, h2rm, h2gy, h2gc, h2bm and h2bc denote said second comparison result data.

It may be so configured that
said third set of three color data represent red, green and blue,
said second set of three color data represent red, green and blue, and said hue data calculation means calculates the hue data r, g, b, y, m, c by subtraction in accordance with:

$r = Ri - \alpha,$ $g = Gi - \alpha,$ $b = Bi - \alpha,$ $y = \beta - Bi,$ $m = \beta - Gi,$ and $c = \beta - Ri,$ wherein Ri, Gi and Bi represent said third set of three color data.

It may be so configured that
said third set of three color data represent cyan, magenta and yellow,
said second set of three color data represent red, green and blue,
said device further comprises means for determining complement of said third set of three color data, and
said hue data calculation means calculates the hue data r, g, b, y, m, c by subtraction in accordance with:

$r = Ri - \alpha,$ $g = Gi - \alpha,$ $b = Bi - \alpha,$ $y = \beta - Bi,$ $m = \beta - Gi,$ and $c = \beta - Ri,$ wherein Ri, Gi and Bi represent data produced by the determination of the complement of said third set of three color data.

It may be so configured that
said third set of three color data represent cyan, magenta and yellow,
said second set of three color data represent cyan, magenta and yellow, and
said hue data calculation means calculates the hue data r, g, b, y, m, c by subtraction in accordance with:

$r = \beta - Ci,$ $g = \beta - Mi,$ $b = \beta - Yi,$ $y = Yi - \alpha,$ $m = Mi - \alpha,$ and $c = Ci - \alpha,$ wherein Ci, Mi and Yi represent said third set of three color data.

It may be so configured that
said third set of three color data represent red, green and blue,
said second set of three color data represent cyan, magenta and yellow,
said device further comprises means for determining complement of said third set of three color data, and said hue data calculation means calculates the hue data r, g, b, y, m, c by subtraction in accordance with:

$r = \beta - Ci$, $g = \beta - Mi$, $b = \beta - Yi$, $y = Yi - \alpha$, $m = Mi - \alpha$, and $c = Ci - \alpha$, wherein Ci, Mi and Yi represent data produced by the determination of the complement of said third set of three color data.

With the above arrangement, the hue data calculating means can be configured of means for performing subtraction based on the input image of red, green and blue, or cyan, magenta and yellow and the maximum value β and minimum value α from the first calculation means.

It may be so configured that
said first comparison-result data generating means determines the comparison-result data among the hue data r, g and b, and the comparison-result data among the hue data y, m and c, and
said second comparison-result data generating means comprises multiplying means for multiplying the first, comparison-result data outputted from said first comparison-result data generating means with specific calculation coefficients, and means for determining the comparison-result data based on the outputs of said multiplication means.

With the above arrangement, the first comparison-result data generating means and the second comparison-result data generating means are configured of means for performing comparison, and means for performing multiplication.

It may be so configured that
said first comparison-result data generating means determines the first comparison-result data:

$h1r = \min(m, y)$, $h1g = \min(y, c)$, $h1b = \min(c, m)$, $h1c = \min(g, b)$, $h1m = \min(b, r)$, and $h1y = \min(r, g)$, (with min (A, B) representing the minimum value of A and B), and
said second comparison-result data generating means determines the second comparison-result data:

$h2ry = \min(aq1*h1y, ap1*h1r)$, $h2rm = \min(aq2*h1m, ap2*h1r)$, $h2gy = \min(aq3*h1y, ap3*h1g)$, $h2gc = \min(aq4*h1c, ap4*h1g)$, $h2bm = \min(aq5*h1m, ap5*h1b)$, and $h2bc = \min(aq6*h1c, ap6*h1m)$, With the above arrangement, the first comparison-result data generating means can be configured of means for performing minimum value selection, and the second comparison-result data can be configured of means for performing multiplication and means for performing minimum value selection.

It may be so configured that said multiplying means in said second comparison-result data generating means performs calculation on said first comparison result-data and said calculation coefficients by setting said calculation coefficients aq1 to aq6 and ap1 to ap6 to integral values of $2^n$, with n being an integer, and by bit shifting.

With the above arrangement, the multiplication can be carried out by means of bit shifting.

It may be so configured that each of said first comparison-result data is determined from two of the hue data and is effective for only one of the six hues of red, green, blue, cyan, magenta and yellow.

With the above arrangement, each of the six hues can be adjusted by varying the coefficients for the first comparison-result data without influencing other hues.

It may be so configured that
each of said second comparison-result data is determined from two of the first comparison-result data and is effective for only one of the six inter-hue areas of red-yellow, yellow-green, green-cyan, cyan-blue, blue-magenta, and magenta-red.

With the above arrangement, each of the six inter-hue areas can be adjusted by varying the coefficients for the second comparison-result data without influencing other inter-hue areas.

It may be so configured that
said coefficient generating means generates specified matrix coefficients Eij (i=1 to 3, j=1 to 3) based on a formula (5) below:

$$(Eij) = \begin{bmatrix} 1 & 0 & 0 \\ 0 & 1 & 0 \\ 0 & 0 & 1 \end{bmatrix} \quad (5)$$

With the above arrangement, it is not necessary to multiply the coefficients with the hue data and yet adjustment can be made only to the target hue or inter-hue area (among the six hues of red, blue, green, yellow, cyan and magenta, and six inter-hue areas), without influencing other hues or inter-hue areas.

It may be so configured that
said first calculation means calculates a maximum value β and a minimum value α using said third set of three color data, and generates an identification code indicating the hue data which is of a value zero, and
said coefficient generating means generates said matrix coefficients based on the identification code outputted from said first calculation means, and
said second calculation means performs matrix calculation using the coefficient from said coefficient generating means to produce the second set of three color data based on the identification code outputted from said first calculation means.

With the above arrangement, the number of steps for performing the matrix calculation can be reduced.

According to another aspect of the invention, there is provided a color conversion method of performing pixel-by-pixel color conversion from a first set of three color data representing red, green and blue, or cyan, magenta and yellow, into a second set of three color data representing red, green and blue, or cyan, magenta, and yellow, said method comprising the steps of:

(a) converting the gray scale of the first set of three color data to produce a third set of three color data representing red, green and blue, or cyan, magenta and yellow;

(b) calculating a minimum value α and a maximum value of said third set of three color data for each pixel;

(c) calculating hue data r, g, b, y, m and c based on said third set of three color data, and said minimum and maximum values α and β obtained at said step (b);

(d) generating first comparison-result data based on the hue data obtained at said step (c);

(e) generating second comparison-result data based on said first comparison-result data;

(f) generating specified matrix coefficients for the hue data, the first comparison-result data and the second comparison-result data; and (g) calculating, responsive to said hue data, said first comparison-result data, said second comparison-result data, and the coefficients generated at said step (f), said second set of three color data;

said step (g) comprising the step of performing matrix calculation on at least said hue data, said first comparison-result data, said second comparison-result data, and the coefficients obtained at said step (g).

Said step (g) may comprise the steps of:

(g1) performing said matrix calculation on said hue data, said first comparison-result data, said second comparison-result data, and the coefficients obtained at said step (f), and (g2) adding said minimum value α calculated at said step (b) to the results of said matrix calculation.

Said step (g) may alternatively comprise the step of performing said matrix calculation on said hue data, said first comparison-result data, said second comparison-result data, the coefficients obtained at said step (f), and said minimum value α obtained at said step (b).

According to a further aspect of the invention, there is provided a machine-readable recording medium that stores a computer program for implementing the method as described above.

BRIEF DESCRIPTION OF THE DRAWINGS

In the accompanying drawings:

FIG. 10A and FIG. 10B are tables showing the relationship between respective hues or inter-hue areas, and effective calculation terms or data which relate to and are effective for each hue or inter-hue area;

DETAILED DESCRIPTION OF THE PREFERRED EMBODIMENTS

Next, the preferred embodiments of the present invention will be described in detail with reference to the accompanying drawings.

Embodiment 1

Figure 1:
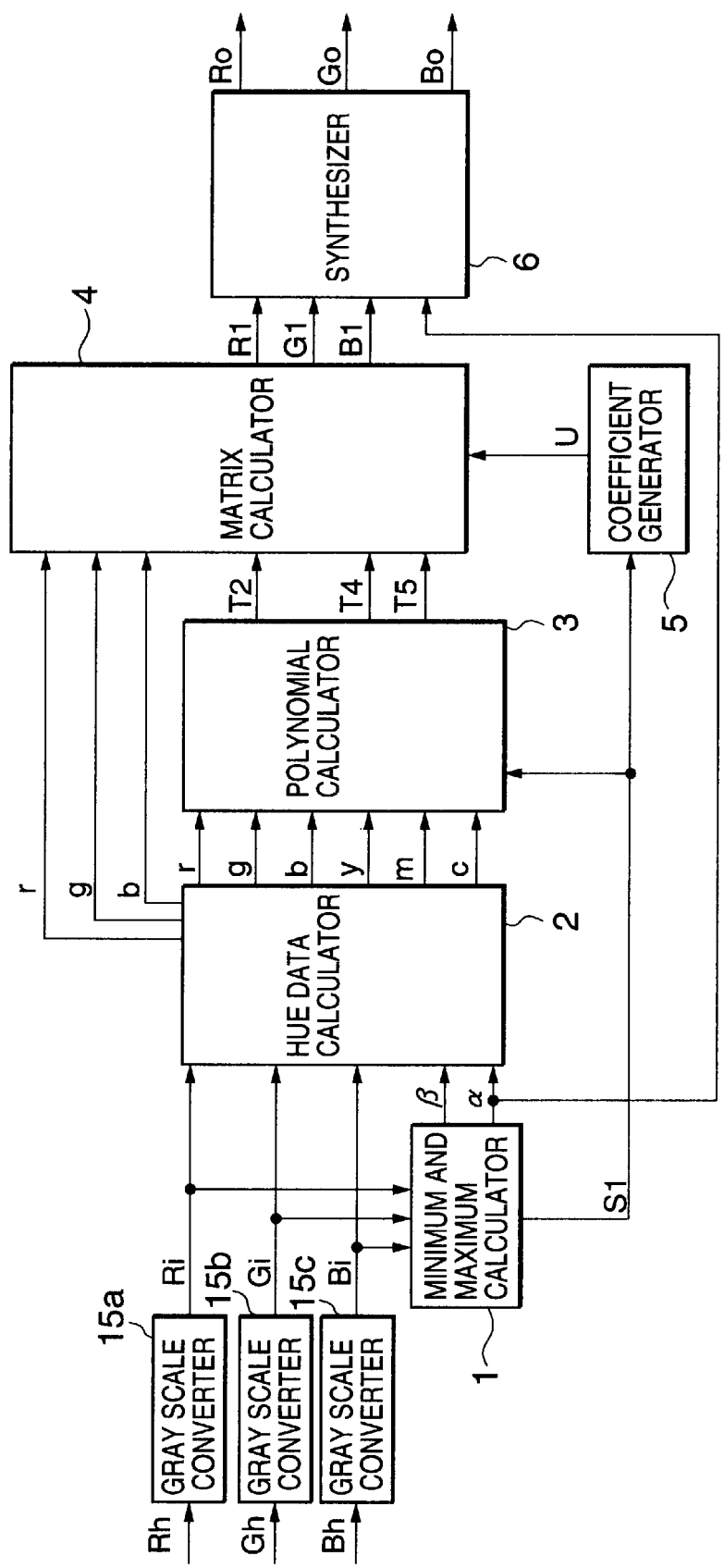
FIG. 1 is a block diagram showing an example of configuration of a color conversion device of Embodiment 1 of the present invention.

FIG. 1 is a block diagram showing an example of configuration of a color conversion device of Embodiment 1 of the present invention. The illustrated color conversion device is for converting a first set of three color data representing red, green and blue, denoted by Rh, Gh and Bh, into a second set of three color data, also representing red, green and blue, denoted by Ro, Go and Bo. Gray scale converters 15a, 15b and 15c respectively convert the gray scale, i.e., tone of the first set of three color data, also called image data, Rh, Gh and Bh, and output image data Ri, Gi and Bi (also a set of three color data).

A minimum and maximum calculator 1 calculates a maximum value β and a minimum value α of the image data Ri, Gi and Bi, and generates and outputs an identification code S1 for indicating, among the six hue data, data which are zero, as will be better understood from the following description. A hue data calculator 2 calculates hue data r, g, b, y, m and c from the image data Ri, Gi and Bi and the outputs from the minimum and maximum calculator 1. The color conversion device further comprises a polynomial calculator 3, a matrix calculator 4, a coefficient generator 5, and a synthesizer 6.

Figures 2, 3:
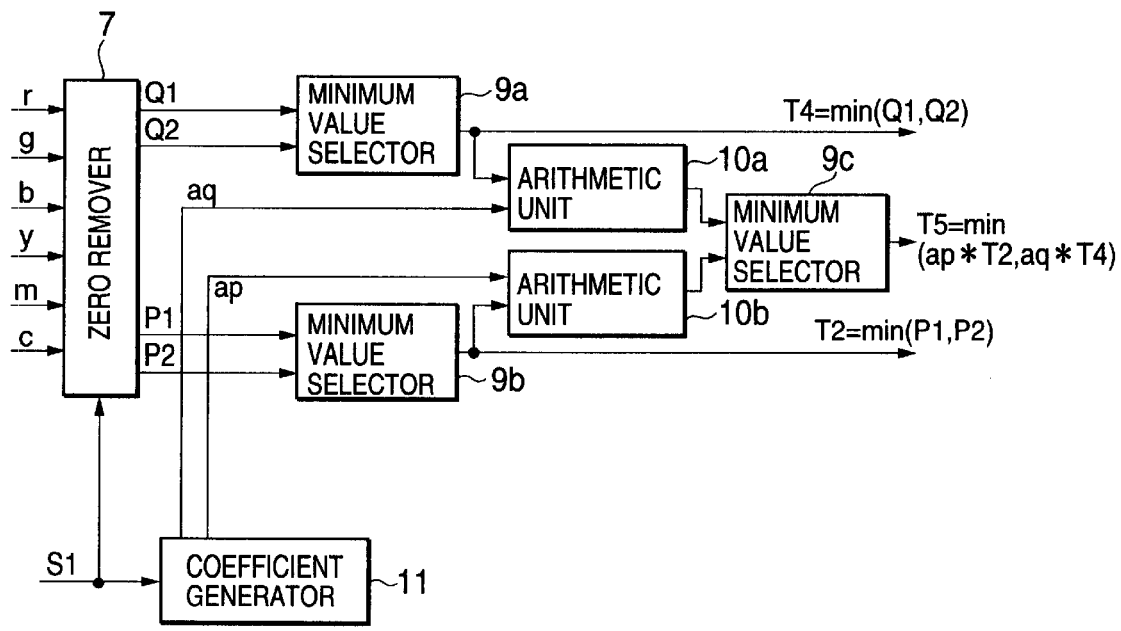
FIG. 2 is a block diagram showing an example of configuration of a polynomial calculator included in the color conversion device of Embodiment 1.
FIG. 3 is a table showing an example of the relationship between an identification code S1, and the maximum and minimum values β and α, and hue data whose value is zero, in the color conversion device of Embodiment 1.

FIG. 2 is a block diagram showing an example of configuration of the polynomial calculator 3. In FIG. 2, a zero remover 7 removes, from the inputted hue data, data which are of value zero. Minimum selectors 9a, 9b and 9c select and output the minimum of the input data. A calculation coefficient generator 11 generates and outputs calculation coefficients based on the identification code S1 from the minimum and maximum calculator 1. Arithmetic units 10a and 10b perform multiplication between the calculation coefficients represented by the outputs of the calculation coefficient generator 11 and the outputs from the minimum selectors 9a and 9b.

Next, the operation will be described. The inputted image data Rh, Gh and Bh corresponding to the three colors of red, green and blue are sent to the gray scale converters 15a, 15b and 15c, where gray scale correction is applied. For instance, where the input signals Rh, Gh and Bh are signals which are non-linear because of a gamma correction applied at a digital camera, for the purpose of correcting gamma characteristics of a cathode ray tube, when the input signals are used for display on a cathode ray tube, or the signals having been subjected to highlight compression processing by which the high-luminance part of the subject to be shot is compressed, as in the case of a shooting with a digital camera, the gray scale converters are used for linearization. The gray scale converters 15a, 15b and 15c may be in the form of a one-dimensional look-up table, or a calculation means having the input-output characteristics of a power function. The image data Ri, Gi and Bi which are output from the gray scale converters 15a, 15b and 15c are sent to the minimum and maximum calculator 1 and the hue data calculator 2. The minimum and maximum calculator 1 calculates and outputs a maximum value β and a minimum value α of the inputted image data Ri, Gi and Bi, and also generates and outputs an identification code S1 for indicating, among the six hue data, data which are zero.

The hue data calculator 2 receives the inputted image data Ri, Gi and Bi and the maximum and minimum values β and α from the minimum and maximum calculator 1, performs subtraction of $r=Ri-\alpha,$ $g=Gi-\alpha,$ $b=Bi-\alpha,$ $y=\beta-Bi,$ $m=\beta-Gi,$ and $c=\beta-Ri,$ and outputs six hue data r, g, b, y, m and c thus obtained.

The maximum and minimum values β and α calculated by the minimum and maximum calculator 1 are respectively represented as follows:

$\beta=\text{MAX}\,(Ri,\,Gi,\,Bi)$ $\alpha=\text{MIN}\,(Ri,\,Gi,\,Bi)$

Since the six hue data r, g, b, y, m and c calculated by the hue data calculator 2 are obtained by the subtraction of $r=Ri-\alpha,$ $g=Gi-\alpha,$ $b=Bi-\alpha,$ $y=\beta-Bi,$ $m=\beta-Gi,$ and $c=\beta-Ri,$ at least two among these six hue data are of a value zero. For example, if a maximum value β is Ri and a minimum value α is Gi (β=Ri, and α=Gi), g=0 and c=0. If a maximum value β is Ri and a minimum value α is Bi (β=Ri, and α=Bi), b=0 and c=0. In other words, in accordance with a combination of Ri, Gi and Bi which are the largest and the smallest, respectively, one of r, g and b, and one of y, m and c, i. e., in total two of them have a value zero.

Thus, in the foregoing minimum and maximum calculator 1, the identification code S1 for indicating, among the six hue data which are zero are generated and outputted. The identification code S1 can assume one of the six values, depending on which of Ri, Gi and Bi are of the maximum and minimum values β and α. FIG. 3 shows a relationship between the values of the identification code S1 and the maximum and minimum values β and α of Ri, Gi and Bi and hue data which has a value zero. In the drawing, the values of the identification code S1 represent just an example, and the values may be other than those shown in the drawing.

Then, the six hue data r, g, b, y, m and c outputted from the hue data calculator 2 are sent to the polynomial calculator 3, and the hue data r, g and b are also sent to the matrix calculator 4. The polynomial calculator 3 also receives the identification code S1 outputted from the minimum and maximum calculator 1, and performs calculation by selecting, from the hue data r, g and b, two data Q1 and Q2 which are not of a value zero, and from the hue data y, m and c, two data P1 and P2 which are not of a value zero. Next, this operation will be described by referring to FIG. 2.

Figures 4, 5:
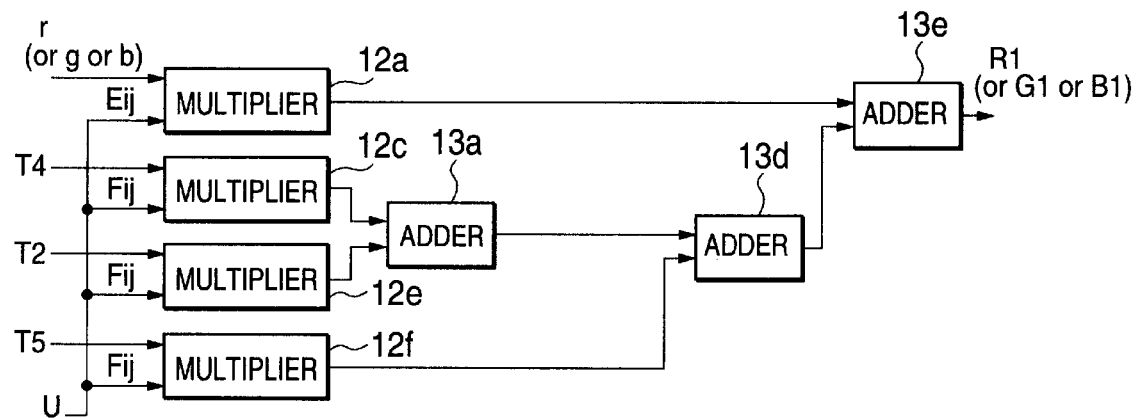
FIG. 4 is a table showing the operation of a zero remover of the polynomial calculator in the color conversion device of Embodiment 1.
FIG. 5 is a block diagram showing an example of configuration of a matrix calculator included in the color conversion device of Embodiment 1.

The hue data from the hue data calculator 2 and the identification code S1 from the minimum and maximum calculator 1 are inputted to the zero remover 7 in the polynomial calculator 3. The zero remover 7 outputs, based on the identification code S1, the two data Q1 and Q2 which are not of a value zero, among the hue data r, g and b and the two data P1 and P2 which are not of a value zero, among the hue data y, m and c. For instance, Q1, Q2, P1 and P2 are determined as shown in FIG. 4, and then outputted. If, for example, the identification code S1 is of a value zero, Q1 and Q2 are obtained from the hue data r and b, and P1 and P2 are obtained from the hue data y and m, so the outputs are given by Q1=r, Q2=b, P1=m and P2=y. As in the case of FIG. 3, the values of the identification code S1 in FIG. 4 represent just an example, and may be other than those shown in FIG. 4.

The minimum selector 9a selects and outputs the minimum value T4=min (Q1, Q2) among the output data Q1 and Q2 from the zero remover 7. The minimum selector 9*b* selects and outputs the minimum value T2=min (P1, P2) among the output data P1 and P2 from the zero remover 7. The outputs of the minimum selectors 9*a* and 9*b* are the first comparison-result data.

The identification code S1 is inputted from the minimum and maximum calculator 1 to the calculation coefficient generator 11, which generates signals indicating calculation coefficients aq and ap based on the identification code S1, and the coefficient aq is supplied to the arithmetic unit 10*a*, and the coefficient ap is supplied to the arithmetic unit 10*b*. These calculation coefficients aq and ap are used for multiplication with the comparison-result data T4 and T2, and each of the calculation coefficients aq and ap can assume one of the six values, corresponding to the value of the identification code S1 shown in FIG. 4. The arithmetic unit 10*a* receives the comparison-result data T4 from the minimum selector 9*a*, performs multiplication of aq*T4, and sends the result to the minimum selector 9*c*. The arithmetic unit 10*b* receives the comparison-result data T2 from the minimum selector 7, performs multiplication of ap*T2, and sends the result to the minimum selector 9*c*.

The minimum selector 9*c* selects and outputs the minimum value T5=min (aq*T2, ap*T4) of the outputs the arithmetic units 10*a* and 10*b*. The output of the minimum value selector 9*c* is a second comparison-result data.

The polynomial data T2, T4 and T5 outputted from the polynomial calculator 3 are supplied to the matrix calculator 4.

The coefficient generator 5 shown in FIG. 1 generates calculation coefficients U (Fij) and fixed coefficients U (Eij) for the polynomial data based on the identification code S1, and sends the same to the matrix calculator 4.

The matrix calculator 4 receives the hue data r, g and b from the hue data calculator 2, the polynomial data T2, T4 and T5 from the polynomial calculator 3 and the coefficients U from the coefficient generator 5, and outputs the results of calculation according to the following formula (6) as image data R1, G1 and B1.

$$\begin{bmatrix} R1 \\ G1 \\ B1 \end{bmatrix} = (Eij) \begin{bmatrix} r \\ g \\ b \end{bmatrix} + (Fij) \begin{bmatrix} T2 \\ T4 \\ T5 \end{bmatrix} \quad (6)$$

For (Eij), i=1 to 3 and j=1 to 3, and for (Fij), i=1 to 3 and j=1 to 3.

FIG. 5, which is a block diagram, shows an example of configuration of part of the matrix calculator 4. Specifically, it shows how R1 is calculated and outputted. As shown in FIG. 5, the matrix calculator 4 includes multipliers 12*a*, 12*c*, 12*e* and 12*f*, and adders 13*a*, 13*d* and 13*e* interconnected as illustrated.

Next, the operation of the matrix calculator 4 of FIG. 5 will be described. The multipliers 12*a*, 12*c*, 12*e* and 12*f* receive the hue data r, the polynomial data T2, T4 and T5 from the polynomial calculator 3 and the coefficients U (Eij) and U (Fij) from the coefficient generator 5, and then output the products thereof. The adder 13*a* receives the products outputted from the multipliers 12*c* and 12*e*, adds the inputted data and outputs the sum thereof. The adder 13*d* adds the output from the adder 13*a* and the product outputted from the multiplier 12*f*. The adder 13*e* adds the output from the adder 13*d* and the output from the multiplier 12*a*, and outputs the sum total thereof as image data R1. In the example of configuration shown in FIG. 5, if the hue data r is replaced by the hue data g or b, and coefficients suitable for the respective terms (data) T2, T4 and T5 are used in substitution, image data GC or B1 can be calculated.

Where it is desired to increase the calculation speed of the color conversion method or the color conversion device of this embodiment, since parts of the coefficients (Eij) and (Fij) which respectively correspond to the hue data r, g and b are used, the configurations each as shown in FIG. 5 may be used in parallel, so as to perform the matrix calculation at a higher speed.

The synthesizer 6 receives the image data R1, G1 and B1 from the matrix calculator 4 and the minimum value α outputted from the minimum and maximum calculator 1 representing the achromatic data, performs addition, and outputs image data Ro, Go and Bo. The equation used for obtaining the image data color-converted by the color-conversion method of FIG. 1 is therefore given by the following formula (1).

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (1)$$

Here, for (Eij), i=1 to 3 and j=1 to 3, and for (Fij), i=1 to 3 and j=1 to 12, and $h1r$=min $(m, y)$, $h1g$=min $(y, c)$, $h1b$=min $(c, m)$, $h1c$=min $(g, b)$, $h1m$=min $(b, r)$, $h1y$=min $(r, g)$, $h2ry$=min $(aq1*h1y, ap1*h1r)$, $h2rm$=min $(aq2*h1m, ap2*h1r)$, $h2gy$=min $(aq3*h1y, ap3*h1g)$, $h2gc$=min $(aq4*h1c, ap4*h1g)$, $h2bm$=min $(aq5*h1m, ap5*h1b)$, and $h2bc$=min $(aq6*h1c, ap6*h1b)$, and aq1 to aq6 and ap1 to ap6 indicate calculation coefficients generated by the calculation coefficient generator 11 of FIG. 2.

The difference between the number of calculation terms in the formula (1) and the number of calculation terms in FIG. 1 is that FIG. 1 shows a method of calculation for each pixel excluding the calculation terms which are of a value zero, while the formula (1) represents a general formula for a set of pixels. In other words, twelve polynomial data for one pixel of the formula (1) can be reduced to three effective data, and this reduction is achieved by exploiting a characteristic of the hue data.

The combination of effective data is changed according to image data of the target pixel. For all image data, all the polynomial data can be effective.

Figure 6A:
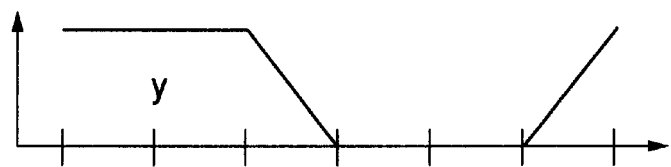
FIG. 6A to FIG. 6F are diagrams schematically showing the relationship between six six hues and hue data.
Figure 6B:
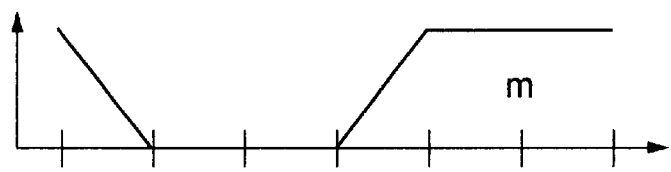
Figure 6C:
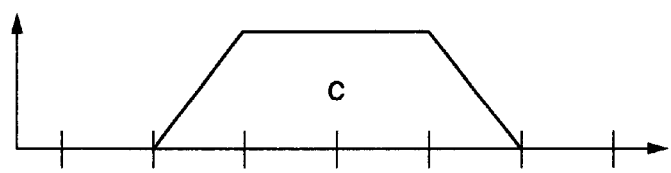
Figure 6D:
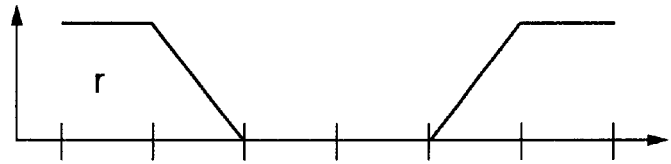
Figure 6E:
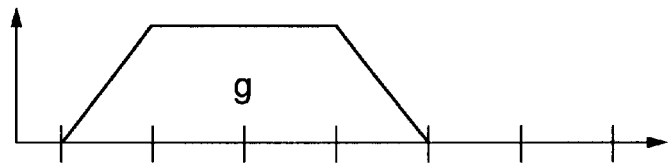
Figure 6F:
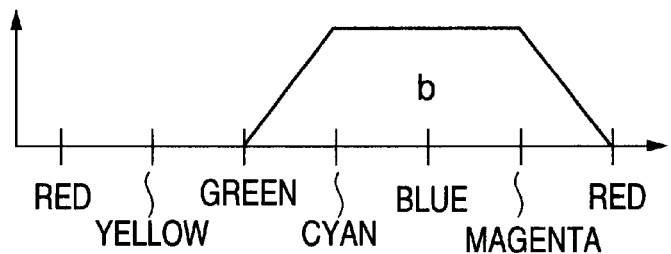
Figure 7A:
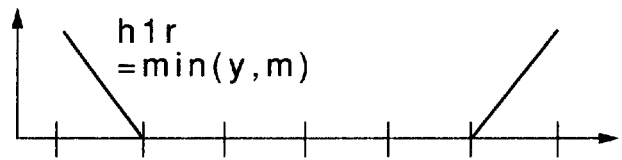
FIG. 7A to FIG. 7F are diagrams schematically showing the relationship between six hues and first comparison-result data in the color conversion device of Embodiment 1.
Figure 7B:
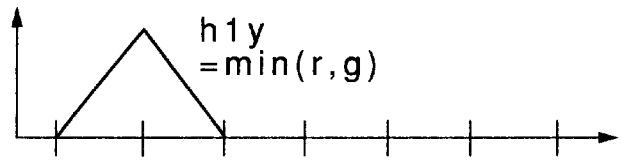
Figure 7C:
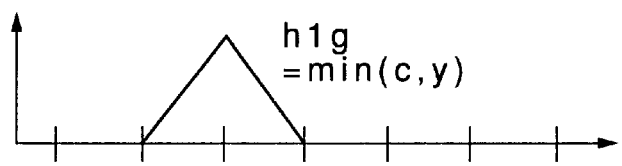
Figure 7D:
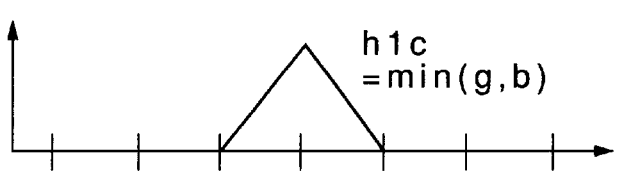
Figure 7E:
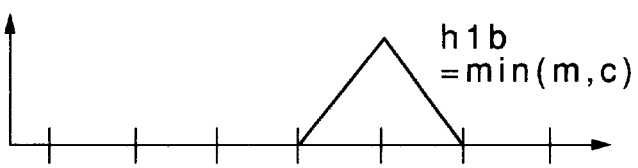
Figure 7F:
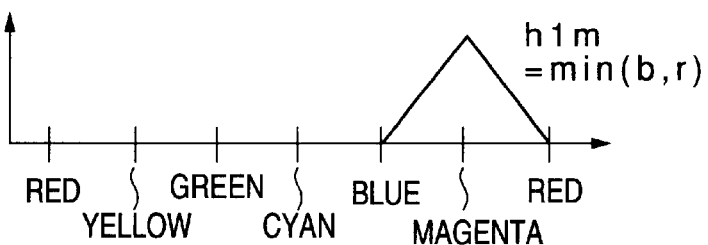
Figure 8A:
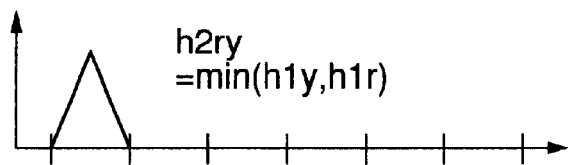
FIG. 8A to FIG. 8F are diagrams schematically showing the relationship between six inter-hue areas and second comparison-result data in the color conversion device of Embodiment 1.
Figure 8B:
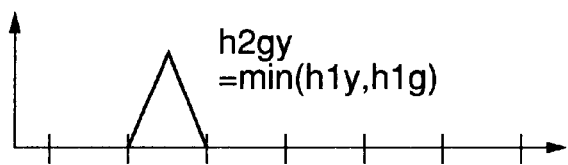
Figure 8C:
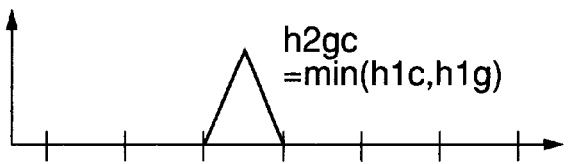
Figure 8D:
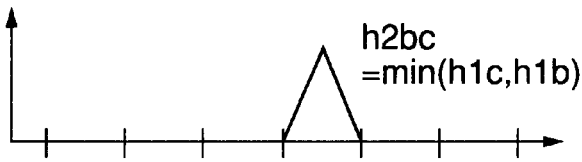
Figure 8E:
Figure 8F:
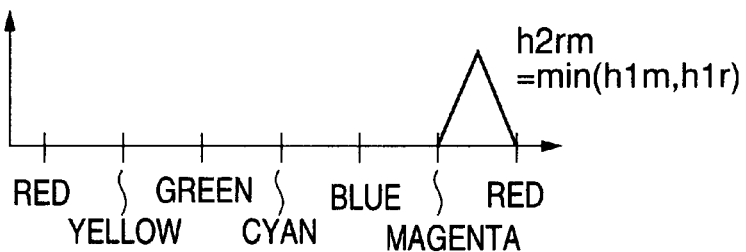
Figure 9A:
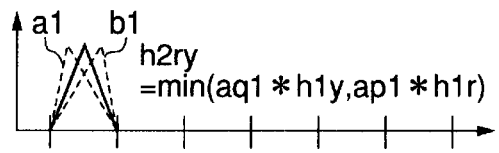
FIG. 9A to FIG. 9F are diagrams schematically showing how the range of each inter-hue area is changed with the change of the coefficients multiplied at the polynomial calculator is changed.
Figure 9B:
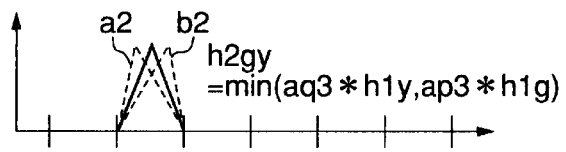
Figure 9C:
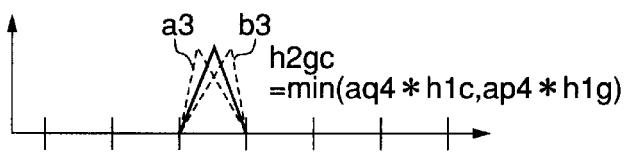
Figure 9D:
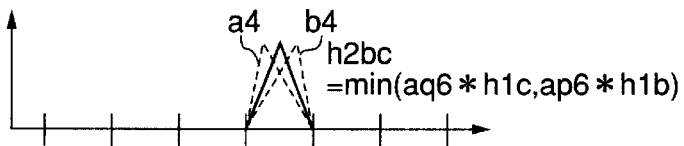
Figure 9E:
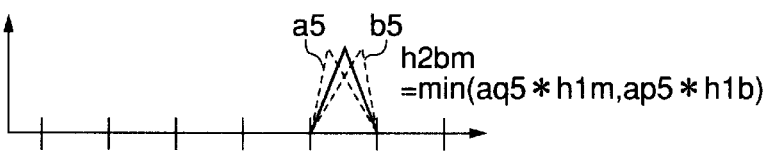
Figure 9F:
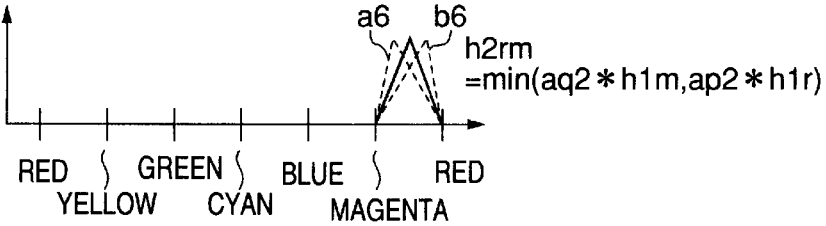

FIG. 6A to FIG. 6F schematically show relations between the six hues (red, yellow, green, cyan, blue, magenta) and the hue data y, m, c, r, g and b. Each hue data relates to, i.e., extends to cover the range of three hues. For example, y as shown in FIG. 6A relates to, or extends to cover three hues of red, yellow and green.

Each of the foregoing formula (6) and (1) includes a first comparison-result data effective only for one hue. The first comparison-result data are:

$h1r$=min $(y, m)$, $h1y$=min $(r, g)$, $h1g$=min $(c, y)$, $h1c$=min $(g, b)$, $h1b$=min $(m, c)$, and $h1m$=min $(b, r)$, FIG. 7A to FIG. 7F schematically show relations between the six hues and first comparison-result data $h1r$, $h1y$, $h1g$, $h1c$, $h1b$, and $h1m$. It is seen that each of the first comparison-result data relates to only one specific hue.

For instance, if W is a constant, for red, r=W, g=b=0, so that y=m=W, and c=0. As a result, min (y, m)=W has a first-order value. The other five first comparison-result data are all of a value zero. That is, for red, $h1r$=min (y, m) alone is the only effective first comparison-result data. Similarly, $h1g$=min (c, y) is the only effective first comparison-result data for green; $h1b$=min (m, c) for blue; $h1c$=min (g, b) for cyan; $h1m$=min (b, r) for magenta; and $h1y$=min (r, g) for yellow.

FIG. 8A to FIG. 8F schematically show relations between the six hues and second comparison-result data:

$h2ry$=min $(h1y, h1r)$, $h2gy$=min $(h1y, h1g)$, $h2gc$=min $(h1c, h1g)$, $h2bc$=min $(h1c, h1b)$, $h2bm$=min $(h1m, h1b)$, and $h2rm$=min $(h1m, h1r)$, This is the case in which the coefficients aq1 to aq6 and ap1 to ap6 in $h2ry$=min $(aq1*h1y, ap1*h1r)$, $h2rm$=min $(aq2*h1m, ap2*h1r)$, $h2gy$=min $(aq3*h1y, ap3*h1g)$, $h2gc$=min $(aq4*h1c, ap4*h1g)$, $h2bm$=min $(aq5*h1m, ap5*h1b)$, and $h2bc$=min $(aq6*h1c, ap6*h1b)$, in the formula (1) above are all of a value "1".

It can be understood from FIG. 8A to FIG. 8F, that each of the second comparison-result data relates to changes in the six inter-hue areas of red-green, yellow-green, green-cyan, cyan-blue, blue-magenta, and magenta-red. In other words, for red-yellow, b=c=0, and the five terms other than $h2ry$=min (h1y, h1r)=min (min (r, g), min (y, m)) are all zero. Accordingly, only $h2ry$ is an effective second comparison-result data for red-yellow. Similarly, only $h2gy$ is an effective second comparison-result data for yellow-green; $h2gc$ for green-cyan; $h2bc$ for cyan-blue; $h2bm$ for blue-magenta; and $h2rm$ for magenta-red.

Moreover, the range of the inter-hue area to which each of the second comparison-result data relates is half that of the range of the hue to which each of the first comparison-result data relates.

FIG. 9A to FIG. 9F schematically show how the range of the six inter-hue area to which each or the second comparison-result data relate is changed when the coefficients aq1 to aq6 and ap1 to ap6 used for determination of h2ry, h2rm, h2gy, h2gc, h2bm and h2bc according to the foregoing formulae (6) and (1) are changed. The broken lines a1 to a6 shows the characteristics when aq1 to aq6 assume values larger than apt to ap6. The broken lines b1 to b6 shows the characteristics when ap1 to ap6 assume values larger than aq1 to aq6.

Specifically, for inter-hue area red-yellow, only h2ry min (aq1*h1y, ap1*h1r) is an effective second comparison-result data. If, for example, the ratio between aq1 and ap1 is 2:1, the peak value of the second comparison-result data is shifted toward red, as indicated by the broken line al in FIG. 9A, and thus it can be made an effective comparison-result data for an area closer to red in the inter-hue area of red-yellow. On the other hand, for example if the ratio between aq1 and apt is 1:2, the relationship is like that indicated by the broken line b1 in FIG. 9A, the peak value of the second comparison-result data is shifted toward yellow, and thus it can be made an effective comparison-result data for an area closer to yellow in the inter-hue area of red-yellow. Similarly, by respectively changing:

aq3 and ap3 in h2gy for yellow-green, aq4 and ap4 in h2gc for green-cyan, aq6 and ap6 in h2bc for cyan-blue, aq5 and ap5 in h2bm for blue-magenta, and aq2 and ap2 in h2rm for magenta-red, in the area for which each second comparison-result data is most effective can be changed.

FIG. 10A and FIG. 10B respectively show relations between the six hues and inter-hue areas and effective calculation terms. Thus, if the coefficient generator 5 changes coefficients for a calculation term effective for a hue or an inter-hue area to be adjusted, only the target hue or inter-hue area can be adjusted. Further, if coefficients generated by the calculation coefficient generator 11 in the polynomial calculator 3 are changed, part of the inter-hue area where a calculation term in the inter-hue area is most effective can be changed without giving any influence to the other hues.

Next, an example of coefficients generated by the coefficient generator 5 of Embodiment 1 described above with reference to FIG. 1 will be described. The following formula (5) shows an example of coefficients U (Eij) generated by the coefficient generator 5.

$$(Eij) = \begin{bmatrix} 1 & 0 & 0 \\ 0 & 1 & 0 \\ 0 & 0 & 1 \end{bmatrix} \quad (5)$$

If the coefficients U (Fij) in the foregoing formula are all zero this represents the case where color conversion is not executed. The following formula (7) shows the case where, of the coefficients U (Fij), coefficients for first comparison-result data and second comparison-result data, both of which are first-order calculation terms, are represented by, for example Ar1 to Ar3, Ay1 to Ay3, Ag1 to Ag3, Ac1 to Ac3, Ab1 to Ab3, Am1 to Am3, Ary1 to Ary3, Agy1 to Agy3, Agc1 to Agc3, Abc1 to Abc3, Abm1 to Abm3 and Arm1 to Arm3.

$$(Fij) = \begin{bmatrix} Ar1 & Ag1 & Ab1 & Ac1 & Am1 & Ay1 & Ary1 & Arm1 & Agy1 & Agc1 & Abm1 & Abc1 \\ Ar2 & Ag2 & Ab2 & Ac2 & Am2 & Ay2 & Ary2 & Arm2 & Agy2 & Agc2 & Abm2 & Abc2 \\ Ar3 & Ag3 & Ab3 & Ac3 & Am3 & Ay3 & Ary3 & Arm3 & Agy3 & Agc3 & Abm3 & Abc3 \end{bmatrix} \quad (7)$$

In the foregoing, only a hue or an inter-hue area can be adjusted. If coefficients relating to the calculation term for a hue or an inter-hue area to be adjusted are set to values other than zero, and the other coefficients are made to be zero, only the target hue or inter-hue area can be adjusted. For example, if coefficients Ar1 to Ar3 relating to h1r relating to red are set, the red hue is changed, and to vary the colors in the red-to-yellow inter-hue area, the coefficients Ary1 to Ary3 relating to h2ry are used.

Furthermore, if, in the polynomial calculator 3, the values of calculation coefficients aq1 to aq6 and ap1 to ap6 in $h2ry=\min(aq1*h1y, ap1*h1r)$, $h2rm=\min(aq2*h1m, ap2*h1r)$, $h2gy=\min(aq3*h1y, ap3*h1g)$, $h2gc=\min(aq4*h1c, ap4*h1g)$, $h2bm=\min(aq5*h1m, ap5*h1b)$, and $h2bc=\min(aq6*h1c, ap6*h1b)$, are changed so as to assume integral values of 1, 2, 4, 8, . . . , i.e., $2^n$ (where n is an integer), multiplication can be achieved in the arithmetic units 10a and 10b by bit shifting.

As apparent from the foregoing, by changing the coefficients for the first comparison-result data relating to specific hues, it is possible to adjust only the target hue among the six hues of red, blue, green, yellow, cyan and magenta, and by changing the coefficients for the second comparison-result data, it is possible to vary the colors in the six inter-hue areas of red-yellow, yellow-green, green-cyan, cyan-blue, blue-magenta, and magenta-red. The adjustment of each hue or inter-hue area can be achieved independently, i.e., without influencing other hues or other inter-hue areas.

Accordingly, it is possible to obtain color conversion methods or color conversion devices which can change the conversion characteristics flexibly, without requiring a large-capacity memory.

It is noted that the gray scale converters can be realized by a one-dimensional look-up table, and its size is much smaller than the three-dimensional look-up table.

Figure 11:
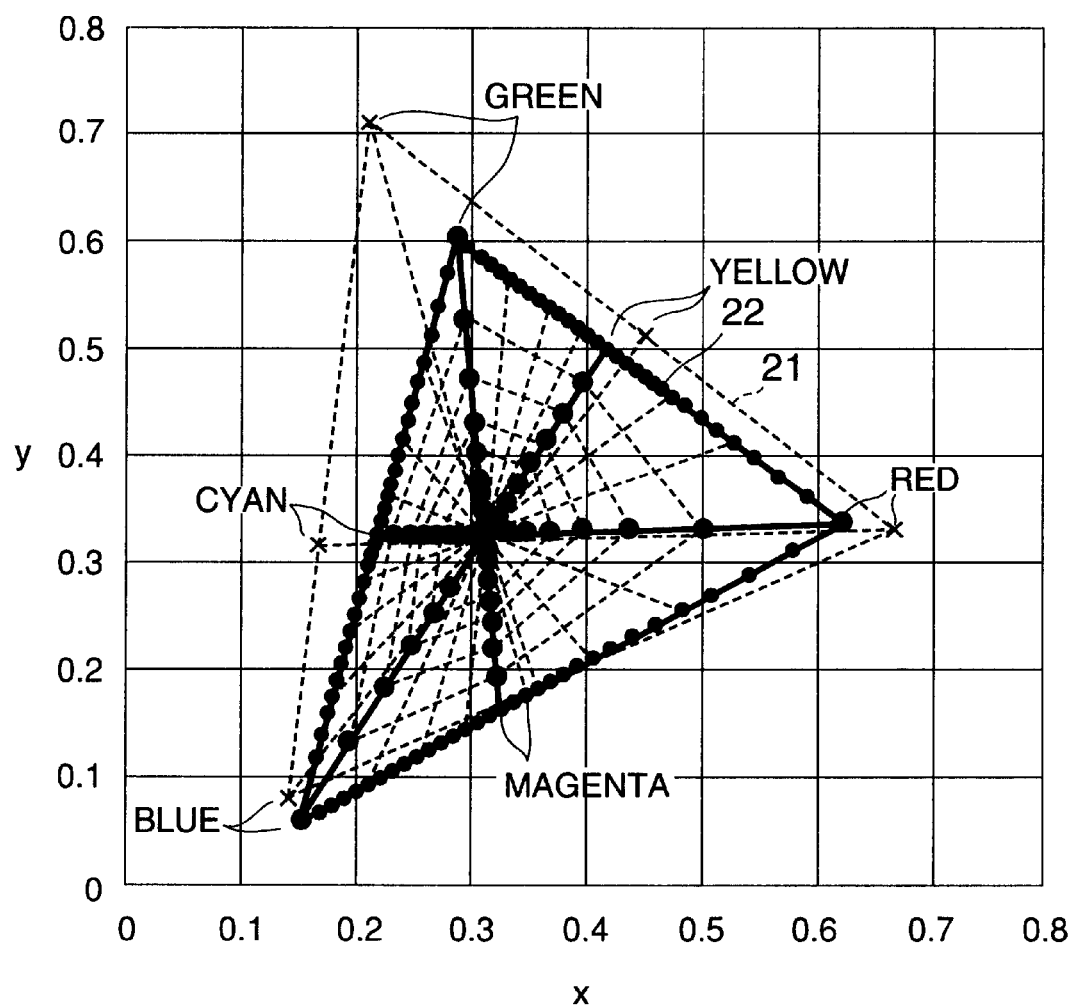
FIG. 11 is an xy chromaticity diagram illustrating the gamut of the color reproduction of the input color signals and the gamut of a desired color reproduction, for explaining the operation of Embodiment 1.
Figure 12:
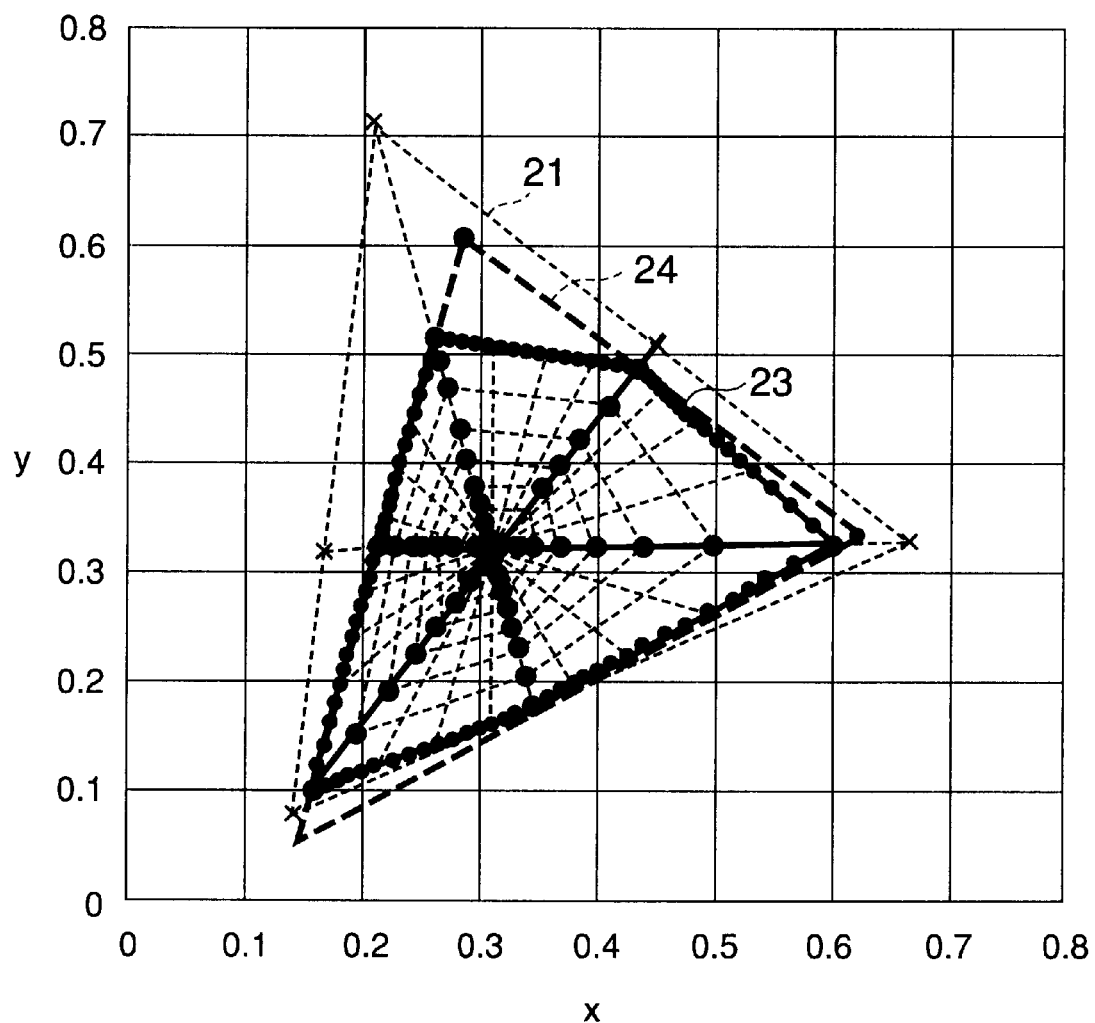
FIG. 12 is an xy chromaticity diagram illustrating the gamut of the color reproduction obtained by adjusting the coefficients for the first comparison-result data, together with the gamut of the desired color reproduction, for explaining the operation of Embodiment 1.
Figure 13:
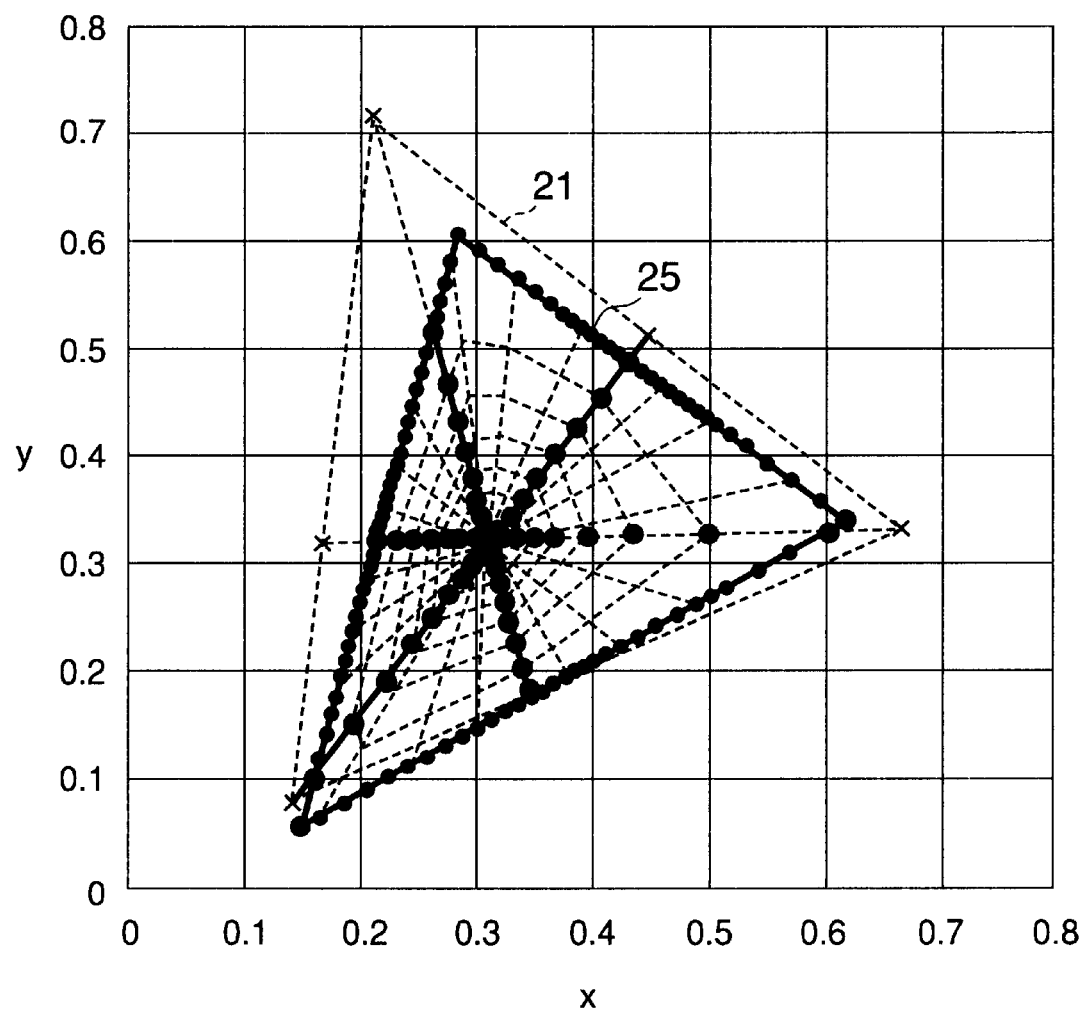
FIG. 13 is an xy chromaticity diagram for explaining the gamut of the color reproduction obtained by adjusting the coefficients for the first and second comparison-result data, together with the gamut of the desired color reproduction, for explaining the operation of Embodiment 1.

Further description on the operation of the color conversion device using the coefficients represented by the formulae (5) and (7) will be given. FIG. 1 to FIG. 13 show an xy chromaticity diagram showing the operation of the color conversion device of Embodiment 1. In FIG. 11 to FIG. 13, the dotted line 21 represents the gamut of the desired color reproduction. In FIG. 11, the triangle of the solid line 22 represents the gamut of color reproduction (reproducible colors) of the input color signals Ri, Gi and Bi. Here, the input color signals may be those for a certain type of image reproducing device, such as a display device, e.g., a CRT monitor. The "desired color reproduction" may be the color reproduction by another type of display device, or theoretical or imaginary color reproduction.

The directions of lines extending from the center of each triangle to the vertexes and points on the sides of the triangle represent respective hues.

In the example of FIG. 11, there are differences between the color reproduction of the input color signals and the desired color reproduction with regard to the directions of the lines extending from the center of the triangle to the vertexes and points on the sides. This means that the hues of the reproduced colors are different.

The color conversion device of Embodiment 1 of the invention uses the first comparison-result data effective for each of the six hues, and the second comparison-result data effective for each of the inter-hue areas.

In FIG. 12, the solid line 23 represents the gamut of the color reproduction after the adjustment of the coefficients for the first comparison-result data, while the broken line 24 represents the gamut of the color reproduction without the adjustment of the coefficients. As will be seen, the hues of the color reproduction as represented by the solid line 23 and the hues of the desired color reproduction as represented by the dotted line 21 coincide with each other. The coincidence is achieved by adjusting the coefficients for the first comparison-result data. However, it is noted that the gamut of the color reproduction as represented by the solid line 23 is narrower than the gamut of the color reproduction as represented by the broken line 24 (without the adjustment of the coefficients).

FIG. 13 shows the gamut 25 of the color reproduction obtained when both the coefficients for the first comparison-result data and the coefficients for the second comparison-result data are adjusted. By adjusting both the coefficients for the first and second comparison-result data, the hues of the color reproduction as represented by the line 25 coincides with the hues of the desired color reproduction, and the gamut 25 of the color reproduction obtained when both the coefficients for the first and second comparison-result data are identical to the gamut (22 in FIG. 11) of the color reproduction obtained when the coefficients for the first and second comparison-result data are not adjusted. That is, in the color conversion device according to Embodiment 1 of the invention, by adjusting the coefficients for the first and second comparison-result data, the hues can be adjusted without narrowing the gamut of the color reproduction.

In Embodiment 1 described above, the hue data r, g, b, y, m and c, and the maximum and minimum values β and α were calculated based on the image data Ri, Gi and Bi obtained after gray scale conversion of inputted image data Rh, Gh and Bh so as to obtain the calculation terms for the respective hues, and the image data Ro, Go, Bo are obtained after the calculation according to the formula (1). As an alternative, after the output image data Ro, Go, Bo are obtained, they may then be converted into complementary color data representing cyan, magenta and yellow, by determining 1's complement. In this case, the same effects will be realized.

Moreover, the conversion characteristics of the gray scale converters 15a, 15b and 15c can be determined taking into consideration the characteristics of the input signals, and are not restricted to inverse gamma correction characteristics, and may be a linear characteristics in an extreme case. However, even in the case of a linear characteristics, by varying the inclination, the level balance of the input signals can be adjusted.

Furthermore, in Embodiment 1 described above, the processing was performed by the hardware configuration of FIG. 1. Needless to say, the same processing can be performed by software in the color conversion device, and in this case, the same effects as those of Embodiment 1 will be provided.

Figure 14:
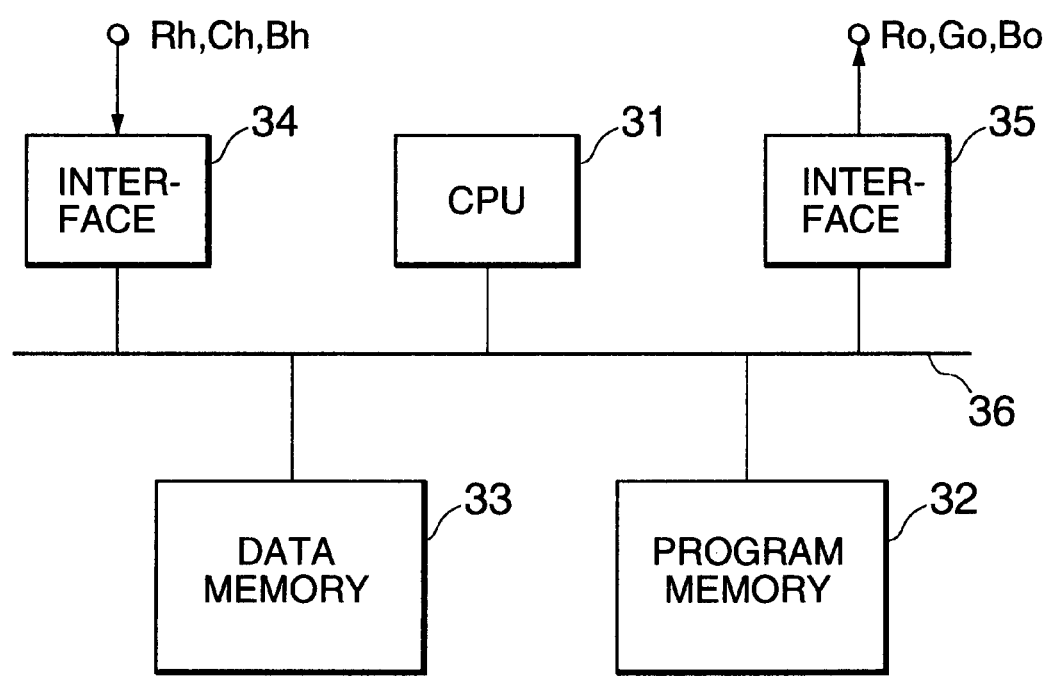
FIG. 14 is a block diagram showing an example of a system for performing the color conversion by means of software.

FIG. 14 shows an example of a system for implementing the color conversion method described above by means of software. The system shown in FIG. 14 includes a CPU (central processing unit) 31, a program memory 32, a data memory 33, an input interface 34, and an output interface 35 interconnected by a bus 36. The CPU 31 operates in accordance with computer programs stored in the program memory 32, and takes in the first set of three color data Rh, Gh and Bh via the interface 34, and performs the color conversion substantially as described above with reference to FIG. 1 to FIG. 11, to produce the second set of three color data Ro, Go and Bo, and outputs the second set of three color data Ro, Go and Bo via the interface 35, such as a video interface, where a display device such as a CRT is connected. The data memory 33 is used for storing the data that have been inputted into the system, or are to be outputted from the system, or are generated during the processing. The program memory 32 may be in the form a semiconductor memory, such as a RAM or a ROM, or a hard-disk drive, or any other form of recording medium that can store the program. The program may be stored in a separate, machine-readable recording medium such as a magnetic disk (floppy disk), or an optical disk, and may be transferred to the program memory when it is desired to perform the color conversion.

Embodiment 2

In Embodiment 1, the hue data r, g, b, y, m and c, and the maximum and minimum values β and α were calculated based on the image data of red, green and blue after the gray scale conversion so as to obtain the calculation terms for the respective hues, and after the matrix calculation, the image data red, green and blue were obtained. But the image data of red, green and blue may first be converted into complementary color data of cyan, magenta and yellow, by determining 1's complement of the input image data, and then color conversion may be executed by inputting the complementary color data of cyan, magenta and yellow.

Figure 15:
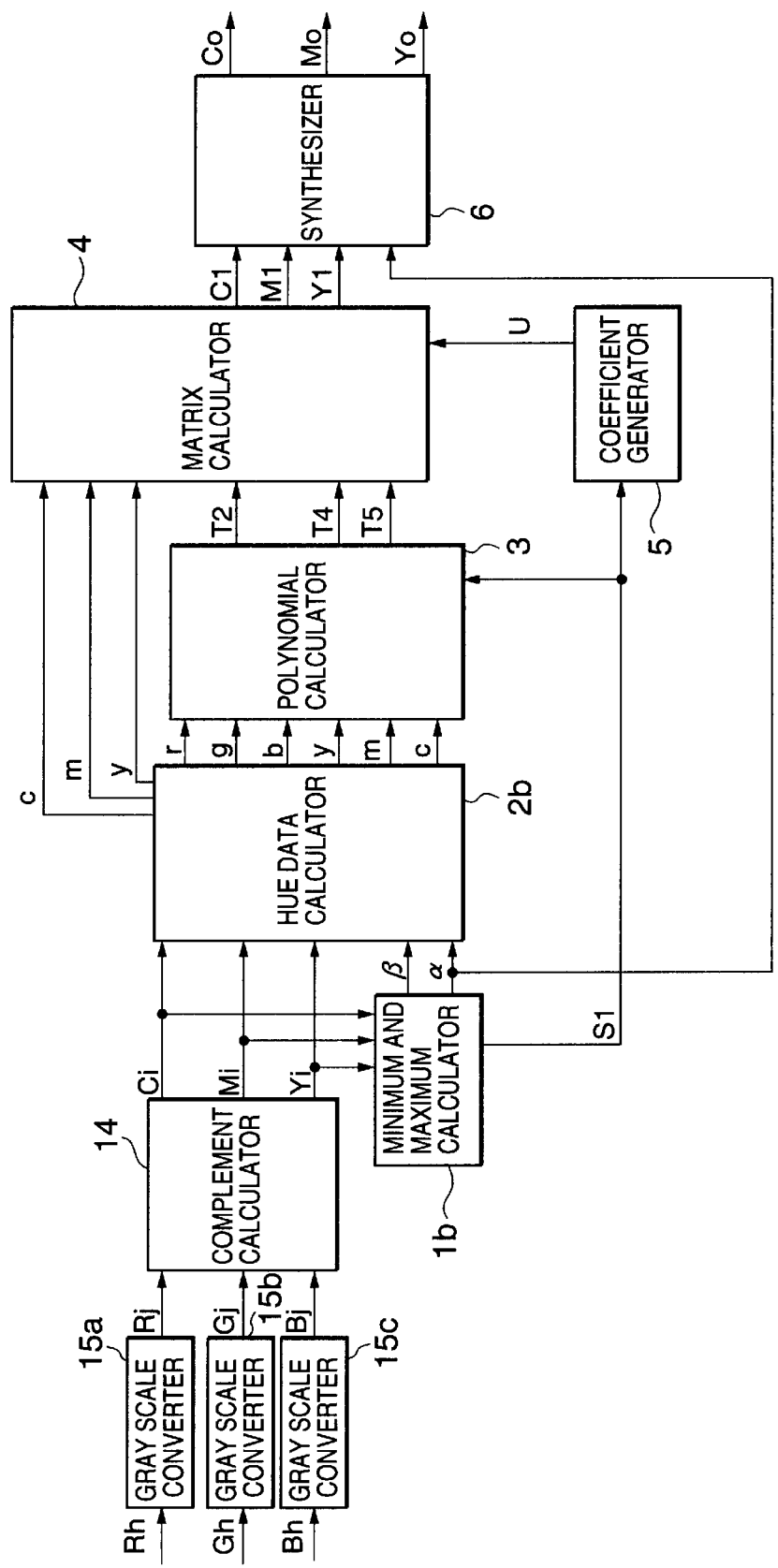
FIG. 15 is a block diagram showing an example of configuration of a color conversion device of Embodiment 2 of the present invention.

FIG. 15 is a block diagram showing an example of configuration of a color conversion device of Embodiment 2 of the present invention. In describing Embodiment 2, the inputted image data of red, green and blue are denoted by Rh, Gh and Bh, and the output of the gray scale converters 15a, 15b and 15c are denoted by Rj, Gj and Bj. Reference numerals 3, 4, 5, 6, 15a, 15b and 15c denote the same members as those described with reference to FIG. 1 in connection with Embodiment 1. Reference numeral 14 denotes a complement calculator for producing complementary color data Ci, Mi and Bi by determining 1's complement of the image data Rj, GJ and Bj output from the gray scale converters 15a, 15b and 15c.; 1b, a minimum and maximum calculator for generating maximum and minimum values β and α of complementary color data and an identification code for indicating, among the six hue data, data which are zero; and 2b, a hue data calculator for calculating hue data r, g, b, y, m and c based on complementary color data Ci, Mi and Yi from the complement calculator 14 and outputs from the minimum and maximum calculator 1b.

Next, the operation will be described. The complement calculator 14 receives the image data Rj, Gj and Bj from the gray scale converters 15a, 15b and 15c, and outputs complementary color data Ci, Mi and Yi obtained by determining 1's complements. The minimum and maximum calculator 1b outputs the maximum and minimum values β and α of each of these complementary color data and the identification code S1.

Then, the hue data calculator 2b receives the complementary color data Ci, Mi and Yi and the maximum and minimum values β and α from the minimum and maximum calculator 1b, performs subtraction of $r = \beta - Ci,$ $g = \beta - Mi,$ $b = \beta - Yi,$ $y = Yi - \alpha,$ $m = Mi - \alpha,$ and $c = Ci - \alpha,$ and outputs six hue data r, g, b, y, m and c. Here, at least two among these six hue data are zero. The identification code S1 outputted from the minimum and maximum calculator 1b is used for specifying, among the six hue data, data which is zero. The value of the identification code S1 depends on which of Ci, Mi and Yi the maximum and minimum values β and α are. Relations between the data among the six hue data which are zero, and the values of the identification code S1 are the same as those in Embodiment 1, and thus further explanation will be omitted.

Then, the six hue data r, g, b, y, m and c outputted from the hue data calculator 2b are sent to the polynomial calculator 3, and the hue data c, m and y are also sent to the matrix calculator 4. The polynomial calculator 3 also receives the identification code S1 outputted from the minimum and maximum calculator 1b, and performs calculation by selecting, from the hue data, two data Q1 and Q2 which are not zero, and from the hue data y, m and c, two data P1 and P2 which are not of a value zero. This operation is identical to that described with reference to FIG. 2 in connection with Embodiment 1, so that detailed description thereof is omitted.

The output of the polynomial calculator 3 is supplied to the matrix calculator 4, and the coefficient generator 5 generates the calculation coefficients U (Fij) and fixed coefficients U (Eij) for the polynomial data based on the identification code S1, and sends the same to the matrix calculator 4. The matrix calculator 4 receives the hue data c, m and y from the hue data calculator 2b, the polynomial data T2, T4 and T5 from the polynomial calculator 3 and the coefficients U from the coefficient generator 5, and outputs the results of calculation according to the following formula (8) as image data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} T2 \\ T4 \\ T5 \end{bmatrix} \quad (8)$$

In the formula (8), for (Eij), i=1 to 3 and j=1 to 3, and for (Fij), i=1 to 3 and j=1 to 3.

The operation at the matrix calculator 4 is similar to that described with reference to FIG. 5 in connection with Embodiment 1, but the inputted hue data is c (or m, y), and C1 (or M1, Y1) is calculated and outputted. The detailed description thereof is therefore omitted. p The synthesizer 6 receives the image data C1, M1 and Y1 from the matrix calculator 4 and the minimum value α outputted from the minimum and maximum calculator 1b representing the achromatic data, performs addition, and outputs image data Co, Mo and Yo. The equation used for obtaining the image data color-converted by the color-conversion method of FIG. 15 is therefore given by the following formula (2).

$$\begin{bmatrix} Co \\ Mo \\ Yo \end{bmatrix} = (Eij)\begin{bmatrix} c \\ m \\ y \end{bmatrix} + (Fij)\begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (2)$$

In the formula (2), for (Eij), i=1 to 3 and j=1 to 3, and for (Fij), i=1 to 3 and j=1 to 12, and $h1r$=min $(m, y)$, $h1g$=min $(y, c)$, $h1b$=min $(c, m)$, $h1c$=min $(g, b)$, $h1m$=min $(b, r)$, $h1y$=min $(r, g)$, $h2ry$=min $(aq1*h1y, ap1*h1r)$, $h2rm$=min $(aq2*h1m, ap2*h1r)$, $h2gy$=min $(aq3*h1y, ap3*h1g)$, $h2gc$=min $(aq4*h1c, ap4*h1g)$, $h2bm$=min $(aq5*h1m, ap5*h1b)$, and $h2bc$=min $(aq6*h1c, ap6*h1b)$, and aq1 to aq6 and ap1 to ap6 indicate calculation coefficients generated by the calculation coefficient generator 11 or FIG. 2.

The difference between the number of calculation terms in the formula (2) and the number of calculation terms in FIG. 15 is that FIG. 15 shows a method of calculation for each pixel excluding the calculation terms which are of a value zero, while the formula (2) represents a general formula for a set of pixels. In other words, twelve polynomial data for one pixel of the formula (2) can be reduced to three effective data, and this reduction is achieved by exploiting a characteristic of the hue data.

The combination of effective data is changed according to image data of the target pixel. For all image data, all the polynomial data can be effective.

The calculation terms output from the polynomial calculator based on the formula (2) are identical to those of the formula (1) in Embodiment 1. Thus, relations between the six hues and inter-hue areas and effective calculation terms are the same as those shown in FIG. 10A and FIG. 10B. Therefore, as in Embodiment 1, in the coefficient generator 5, by changing the coefficients for an effective calculation term for a hue or for an inter-hue area to be adjusted, only the target hue or inter-hue area can be adjusted. In addition, by changing the coefficients in the calculation coefficient generator 11 in the polynomial calculator 3, part of the inter-hue area where the calculation term in the inter-hue area is effective can be changed without giving any influence to the other hues.

Here, an example of coefficients generated by the coefficient generator 5 of Embodiment 2 are the coefficients U (Eij) of the formula (5), as in Embodiment 1. If the coefficients U (Fij) are all zero, color conversion is not executed.

Also, by performing the adjustment based on the coefficients for the first and second comparison-result data, of the coefficients U (Fij) of the formula (7), adjustment on only a hue or an inter-hue area can be achieved. By setting coefficients relating to a calculation term for a hue or an inter-hue area to be changed and setting other coefficients to zero, only the target hue or inter-hue area can be adjusted.

As apparent from the foregoing, by changing the coefficients for the first comparison-result data relating to specific hues, it is possible to adjust only the target hue among the six hues of red, blue, green, yellow, cyan and magenta, and by changing the coefficients for the second comparison-result data, it is possible to vary the colors in the six inter-hue areas of red-yellow, yellow-green, green-cyan, cyan-blue, blue-magenta, and magenta-red. The adjustment of each hue or inter-hue area can be achieved independently, i.e., without influencing other hues or other inter-hue areas.

Accordingly, it is possible to obtain color conversion methods or color conversion devices which can change the conversion characteristics flexibly, without requiring a large-capacity memory.

It is noted that the gray scale converters can be realized by a one-dimensional look-up table, and its size is much smaller than the three-dimensional look-up table.

Furthermore, in Embodiment 2 described above, the processing was performed by the hardware configuration of FIG. 15. Needless to say, the same processing can be performed by software in the color conversion device, and in this case, the same effects as those of Embodiment 2 will be provided.

Moreover, the conversion characteristics of the gray scale converters 15a, 15b and 15c can be determined taking into consideration the characteristics of the input signals, and are not restricted to inverse gamma correction characteristics, and may be a linear characteristics in an extreme case. However, even in the case of a linear characteristics, by varying the inclination, the level balance of the input signals can be adjusted.

Embodiment 3

In Embodiment 1, part of an example of configuration of the matrix calculator 4 is as shown in the block diagram of FIG. 5, and the hue data and the respective calculation terms and the minimum value α among the image data Ri, Gi and Bi which is achromatic data are added together to produce the image data Ro, Go, Bo, as shown in the formula (1). It is possible to adopt a configuration shown in FIG. 16 in which coefficients for the minimum value α which is achromatic data are generated in the coefficient generator, and the matrix calculation is performed on the minimum value α as well, to adjust the achromatic component.

Figure 16:
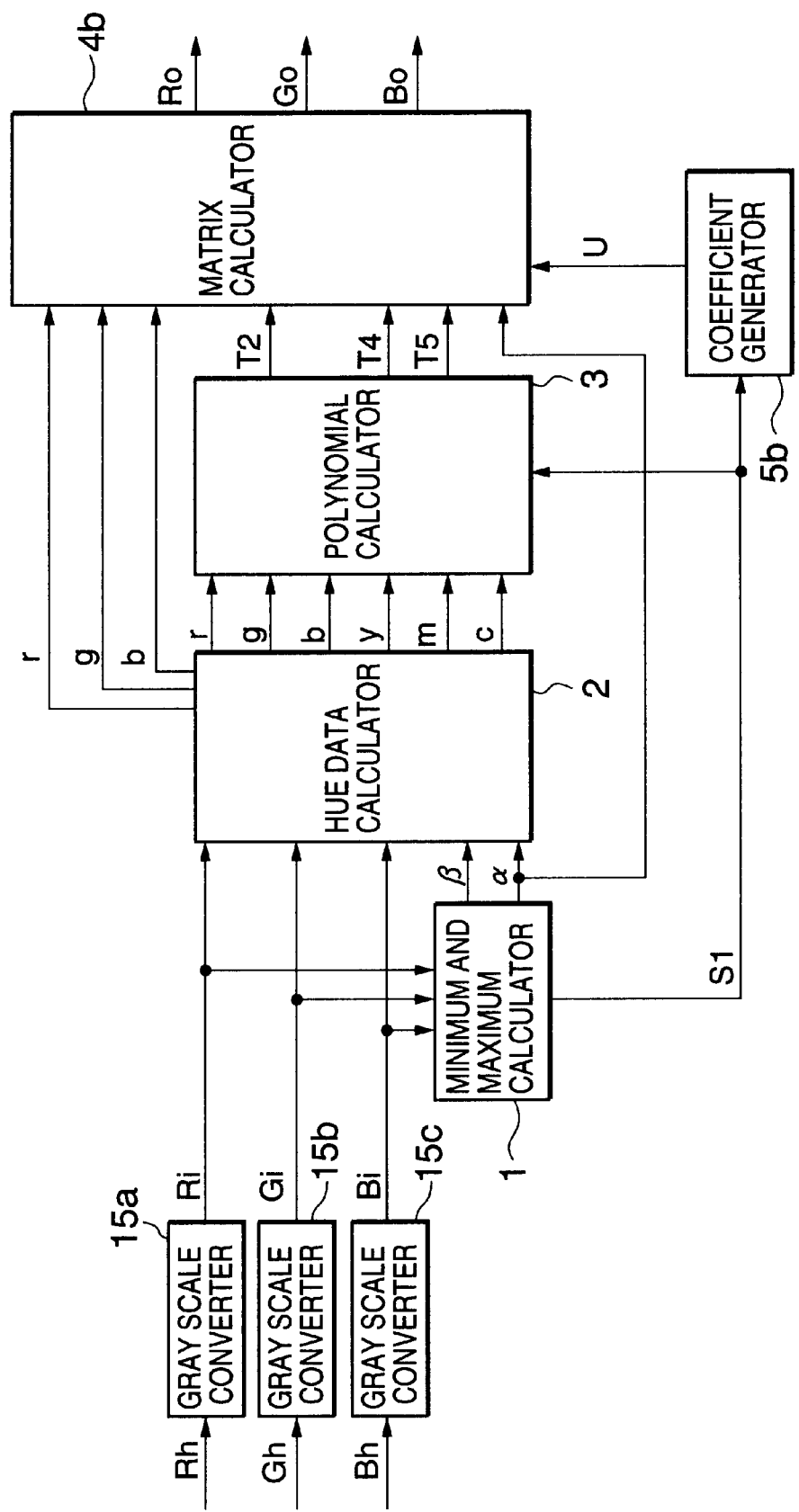
FIG. 16 is a block diagram showing an example of configuration of Embodiment 3 of the present invention.

FIG. 16 is a block diagram showing an example of configuration of a color conversion device of Embodiment 3 of the present invention. In the figure, reference numerals 1, 2, 3, 15a, 15b and 15c denote members identical to those described with reference to FIG. 1 in connection with Embodiment 1. Reference numeral 4b denotes a matrix calculator, and 5b denotes a coefficient generator.

The operation will next be described. The determination of the maximum value β, the minimum value α and the identification code S1 from the inputted data at the minimum and maximum calculator 1, the calculation of the six hue data at the hue data calculator 2, and the determination of the calculation terms at the polynomial calculator 3 are identical to those of Embodiment 1, and detailed description thereof is therefore omitted.

The coefficient generator 5b in FIG. 16 generates the calculation coefficients U (Fij) and the fixed coefficients U (Eij) of the polynomial data based on the identification code S1 and sends them to the matrix calculator 4b. The matrix calculator 4b receives the hue data r, g, and b from the hue data calculator 2, the polynomial data T2, T4 and T5 from the polynomial calculator 3, the minimum value α from the minimum and maximum calculator 1, and the coefficients U from the coefficient generator 5b, and performs calculation thereon. The equation used for the calculation for adjusting the achromatic component as well is represented by the following formula (9).

$$\begin{bmatrix} Ro \\ Go \\ Bo \end{bmatrix} = (Eij) \begin{bmatrix} r \\ g \\ b \end{bmatrix} + (Fij) \begin{bmatrix} T2 \\ T4 \\ T5 \\ \alpha \end{bmatrix} \quad (9)$$

In the formula (9), for (Eij), i=1 to 3 and j=1 to 3, and for (Fij), i=1 to 3 and j=1 to 4.

Figure 17:
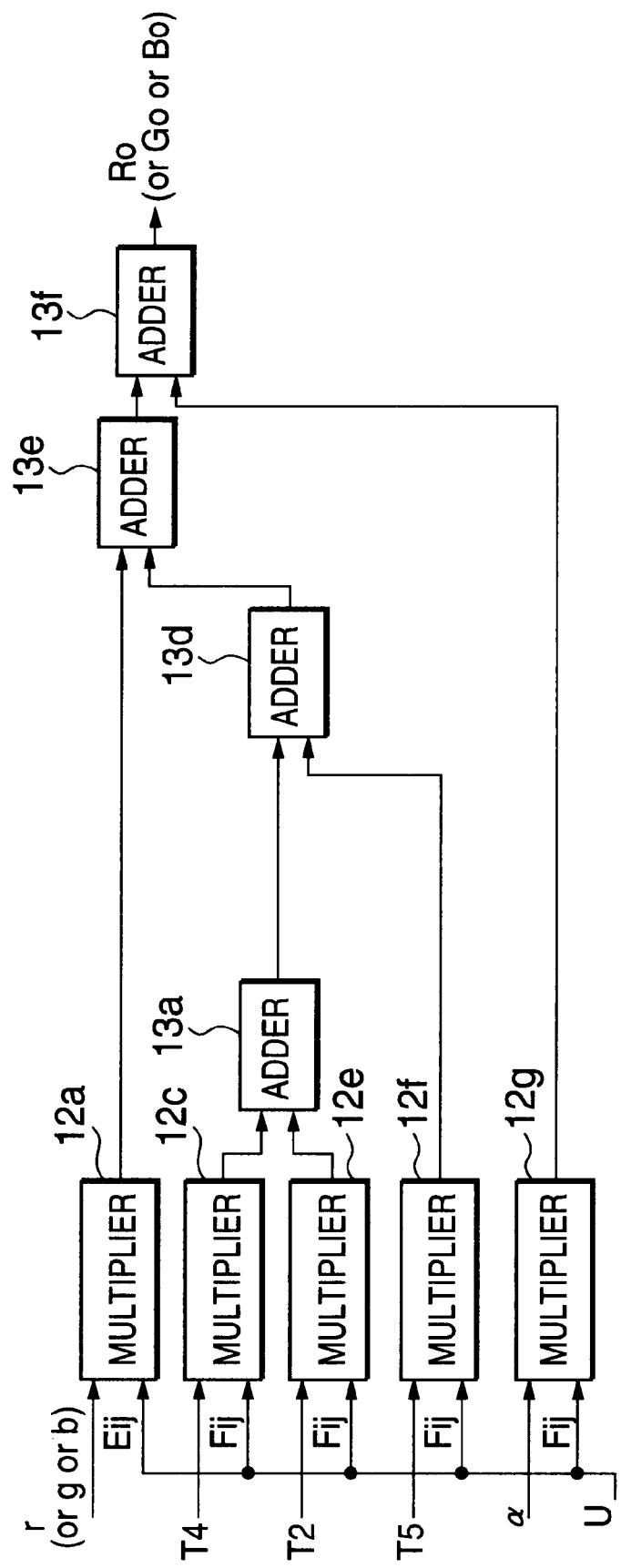
FIG. 17 is a block diagram showing part of an example of configuration of a matrix calculator included in the color conversion device of Embodiment 3.

FIG. 17 is a block diagram showing an example of configuration of the matrix calculator 4b. In FIG. 17, reference numerals 12a, 12c, 12e, 12f, 13a, 13d and 13e denote members identical to those in the matrix calculator 4 of Embodiment 1. Reference numeral 12g denotes a multiplier receiving the minimum value α from the minimum and maximum calculator 1 indicating the achromatic component, and the coefficients U from the coefficient generator 5b, and performs multiplication thereon. Reference numeral 13f denotes an adder.

Next, the operation will be described. The multipliers 12a, 12c, 12e and 13f receive the hue data r, the polynomial data T2, T4 and T5 from the polynomial calculator 3 and the coefficients U (Eij) and U (Fij) from the coefficient generator 5, and then output the products thereof. The adders 13a, 13d and 13e add the products and sums. These operations are identical to those of the matrix calculator 4 in Embodiment 1. The multiplier 12g receives the minimum value α among the image data Ri, Gi and Bi, from the minimum and maximum calculator 1 which corresponds to the achromatic component, and the coefficients U (Fij) from the coefficient generator 5b, and performs multiplication, and outputs the product to the adder 13f, where the product is added to the output of the adder 13e, and the sum total is output as the image data Ro. In the example of FIG. 17, if the hue data r is replaced by g or b, the image data Go or Bo is calculated.

The part of the coefficients (Eij) and (Fij) corresponding to the hue data r, g and b are used. In other words, if three configurations, each similar to that of FIG. 17, are used in parallel for the hue data r, g and b, matrix calculation can be performed at a higher speed.

The equation for determining the image data is represented by the following formula (3).

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (3)$$

In the formula (3), for (Eij), i=1 to 3 and j=1 to 3, and for (Fij), i=1 to 3 and j=1 to 13.

The difference between the number of calculation terms in the formula (3) and the number of calculation terms in FIG. 16 is that, as in Embodiment 1, FIG. 16 shows a method of calculation for each pixel excluding the calculation terms which are of a value zero, while the formula (3) represents a general formula for a set of pixels. In other words, thirteen polynomial data for one pixel of the formula (3) can be reduced to four effective data, and this reduction is achieved by exploiting a characteristic of the hue data.

The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients for the first comparison-result data relating to specific hues, and the second comparison-result data relating to the inter-hue areas, it is possible to adjust only the target hue or inter-hue area among the six hues of red, blue, green, yellow, cyan and magenta, and the six inter-hue areas, without influencing other hues and inter-hue areas. By changing the coefficients relating to the minimum value α which is the achromatic data, it is possible to adjust only the achromatic component without influencing the hue components, and choose between a standard black, reddish black, bluish black and the like.

In Embodiment 3 described above, the image data Ro, Go and Bo are obtained after the calculation according to the formula (3). As an alternative, after the output image data Ro, Go, Bo are obtained, they may then be converted to data representing cyan, magenta and yellow, by determining 1's complement. If the coefficients used in the matrix calculation can be changed for the respective hues, the inter-hue areas, and the minimum value α which is achromatic data, effects similar to those discussed above can be obtained.

As in Embodiment 1 described above, in Embodiment 3, as well, the same processing can be performed by software in the color conversion device, and in this case, the same effects as those of Embodiment 3 will be provided.

Moreover, the conversion characteristics of the gray scale converters 15a, 15b and 15c can be determined taking into consideration the characteristics of the input signals, and are not restricted to inverse gamma correction characteristics, and may be a linear characteristics in an extreme case. However, even in the case of a linear characteristics, by varying the inclination, the level balance of the input signals can be adjusted.

Embodiment 4

Embodiment 2 was configured to add the hue data, the calculation terms, and the minimum value α which is achromatic data, as shown in the formula (2). As an alternative, the configuration may be such that coefficients for the minimum value α which is achromatic data is generated at the coefficient generator, and the matrix calculation be performed on the minimum value α as well, as shown in FIG. 18, so that the achromatic component is thereby adjusted.

Figure 18:
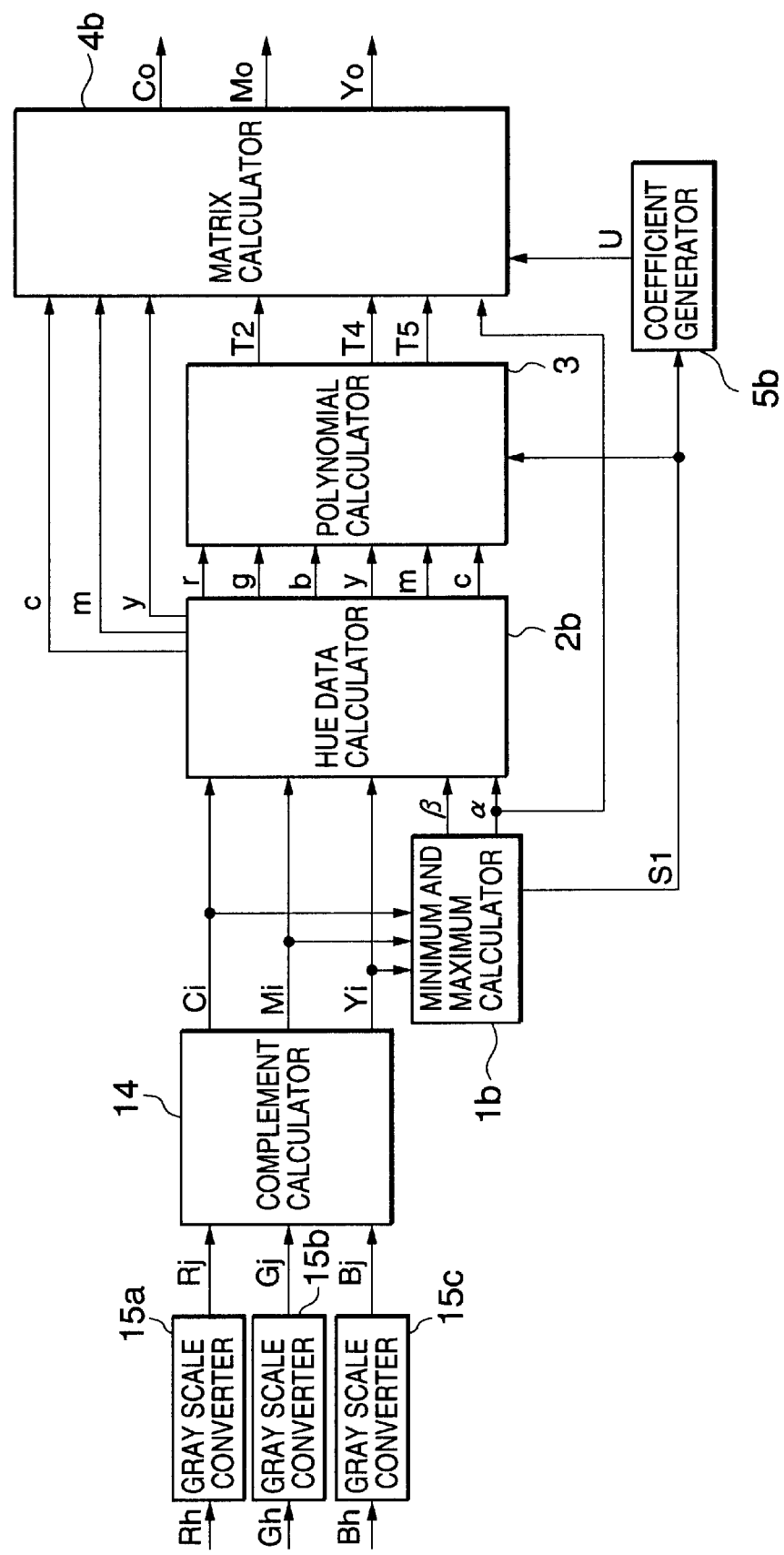
FIG. 18 is a block diagram showing an example of configuration of a color conversion device of Embodiment 4 of the present invention.

FIG. 18 is a block diagram showing an example of configuration of color conversion device according to Embodiment 4 of the invention. In the figure, reference numerals 14, 1*b*, 2*b*, 3, 15*a*, 15*b* and 15*c* denote members identical to those described with reference to FIG. 15 in connection with Embodiment 2, and reference numerals 4*b* and 5*b* denote members identical to those described with reference to FIG. 16 in connection with Embodiment 3.

The operation will next be described. The image data Rj, Gj, Bj obtained as a result of the gray scale conversion are input to the complement calculator 14 to obtain the complementary data Ci, Mi, Yi by the process of determining 1's complement. The determination of the maximum value β, the minimum value α and the identification code S1 at the minimum and maximum calculator 1*b*, the calculation of the six hue data at the hue data calculator 2*b*, and the determination of the calculation terms at the polynomial calculator 3 are identical to those in the case of the complementary data Ci, Mi, Yi in Embodiment 2. The detailed description thereof are therefore omitted.

The coefficient generator 5*b* in FIG. 18 generates the calculation coefficients U (Fij) and the fixed coefficients U (Eij) of the polynomial data based on the identification code S1 and sends them to the matrix calculator 4*b*. The matrix calculator 4*b* receives the hue data c, m, and y from the hue data calculator 2*b*, the polynomial data T2, T4 and T5 from the polynomial calculator 3, the minimum value α from the minimum and maximum calculator 1, and the coefficients U from the coefficient generator 5*b*, and performs calculation thereon. The equation used for the calculation is represented by the following formula (10), and the achromatic component is adjusted.

$$\begin{bmatrix} Co \\ Mo \\ Yo \end{bmatrix} = (Eij) \begin{bmatrix} c \\ m \\ y \end{bmatrix} + (Fij) \begin{bmatrix} T2 \\ T4 \\ T5 \\ \alpha \end{bmatrix} \quad (10)$$

In the formula (10), for (Eij), i=1 to 3 and j=1 to 3, and for (Fij), i=1 to 3 and j=1 to 4.

The operation at the matrix calculator 4*b* is similar to that described with reference to FIG. 17 in connection with Embodiment 3, but the inputted hue data is c (or m, y), and Co (or Mo, Yo) is calculated and outputted. The detailed description thereof is therefore omitted.

The equation for determining the image data is represented by the following formula (4).

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (4)$$

In the formula (4), for (Eij), i=1 to 3 and j=1 to 3, and for (Fij), i=1 to 3 and j=1 to 13.

The difference between the number of calculation terms in the formula (4) and the number of calculation terms in FIG. 18 is that, as in Embodiment 2, FIG. 18 shows a method of calculation for each pixel excluding the calculation terms which are of a value zero, while the formula (4) represents a general formula for a set of pixels. In other words, thirteen polynomial data for one pixel of the formula (4) can be reduced to four effective data, and this reduction is achieved by exploiting a characteristic of the hue data.

The combination of effective data is changed according to image data of the target pixel. For all image data, all the polynomial data can be effective.

If all the coefficients relating to the minimum value α are "1", the achromatic data is not converted, and will be of the same value as the achromatic data in the inputted data. If the coefficients used in the matrix calculation are changed, it is possible to choose between reddish black, bluish black, and the like, and the achromatic component can be adjusted.

As apparent from the foregoing, by changing the coefficients for the first comparison-result data relating to specific hues, and the second comparison-result data relating to the inter-hue areas, it is possible to adjust only the target hue or inter-hue area among the six hues of red, blue, green, yellow, cyan and magenta, and the six inter-hue areas, without influencing other hues and inter-hue areas. By changing the coefficients relating to the minimum value α which is the achromatic data, it is possible to adjust only the achromatic component without influencing the hue components, and choose between a standard black, reddish black, bluish black and the like.

As in Embodiment 1 described above, in Embodiment 4, as well, the same processing can be performed by software in the color conversion device, and in this case, the same effects as those of Embodiment 4 will be provided.

Moreover, the conversion characteristics of the gray scale converters 15*a*, 15*b* and 15*c* can be determined taking into consideration the characteristics of the input signals, and are not restricted to inverse gamma correction characteristics, and may be a linear characteristics in an extreme case. However, even in the case of a linear characteristics, by varying the inclination, the level balance of the input signals can be adjusted.

Embodiment 5

Figure 19:
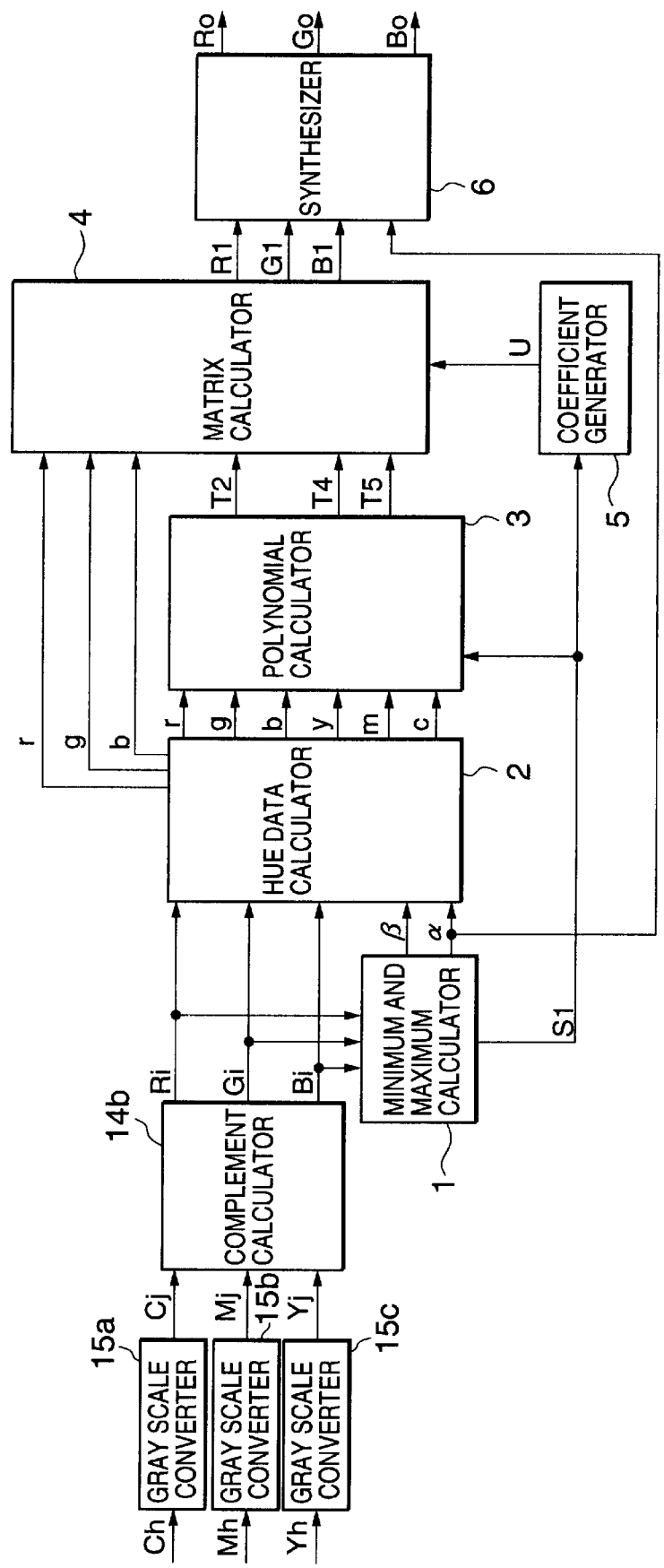
FIG. 19 is a block diagram showing an example of configuration of a color conversion device of Embodiment 5 of the present invention.
Figure 20:
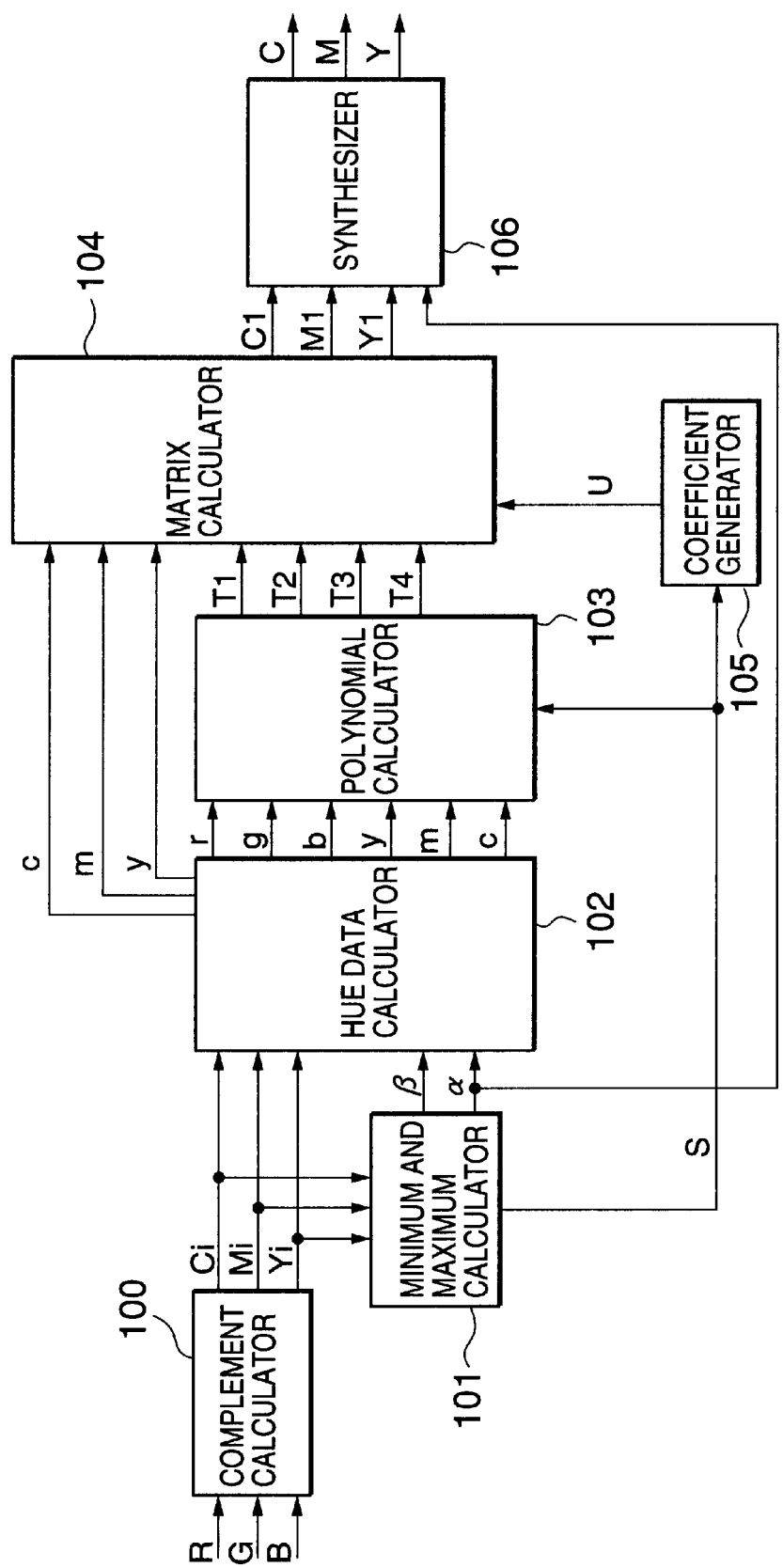
FIG. 20 is a block diagram showing an example of configuration of a conventional color conversion device.
Figure 21A:
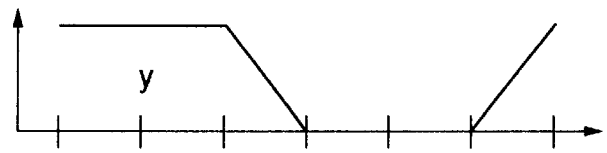
FIG. 21A to FIG. 21F are diagrams schematically showing the relationship between six hues and hue data in the conventional color conversion device.
Figure 21B:
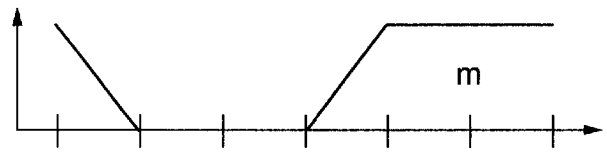
Figure 21C:
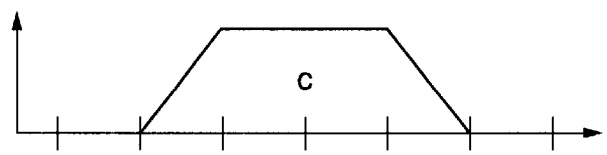
Figure 21D:
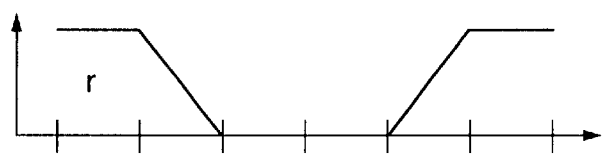
Figure 21E:
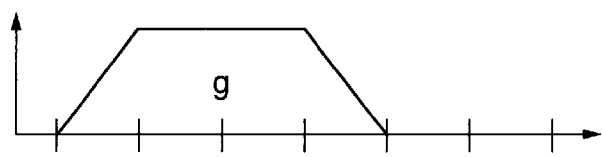
Figure 21F:
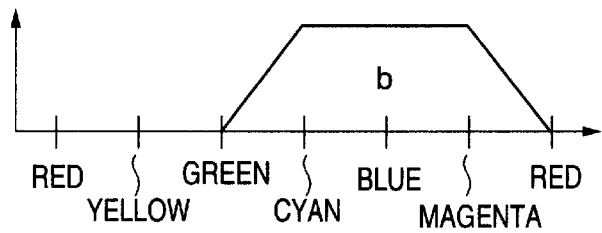
Figure 22A:
FIG. 22A to FIG. 22F are diagrams schematically showing the relationship between six hues and calculation terms in a matrix calculator included in the conventional color conversion device.
Figure 22B:
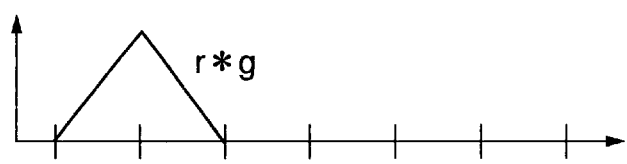
Figure 22C:
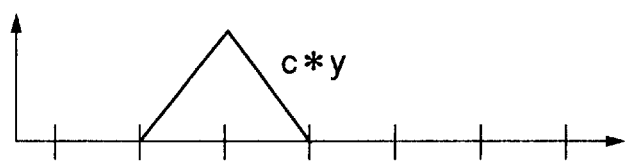
Figure 22D:
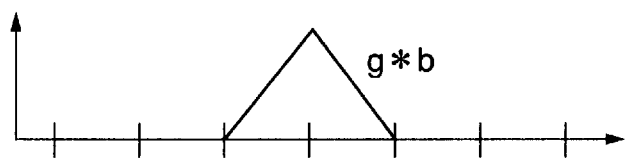
Figure 22E:
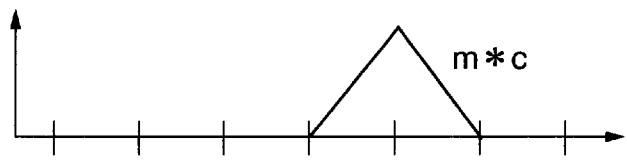
Figure 22F:
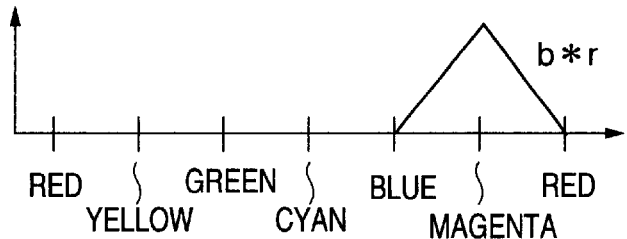

In Embodiment 2 and Embodiment 4, the image data Ci, Mi, Yi are obtained by determining 1's complement of image data Rj, Gj and Bj. Similarly, the image data Ri, Gi, Bi used in Embodiment 1 may be those obtained by 1's complement of image data representing cyan, magenta and yellow, Cj, Mj and Yj obtained as a result of the gray scale conversion of input image data Ch, Mh and Yh. For the determination of the 1's complement of the image data Cj, Mj, Yj, a complement calculator which is similar to the complement calculator 14 in FIG. 15 or FIG. 18 but which receives the image data Cj, Mj, Yj may be used. FIG. 19 shows an example of color conversion device having such a complement calculator denoted 14*b*. Apart from the addition of the complement calculator 14*b*, the configuration of the color conversion device of FIG. 19 is similar to the color conversion device of FIG. 1. Similar modification may be made to the color conversion device of Embodiment 3 shown in FIG. 16.

Modifications described in connection with Embodiment 1 to Embodiment 4 can also be applied to Embodiment 5. Moreover, the modification described in connection with Embodiment 1 referring to FIG. 14 can be applied to Embodiment 2 to Embodiment 5.

What is claimed is:

1. A color conversion device for performing pixel-by-pixel color conversion from a first set of three color data representing red, green and blue, or cyan, magenta and yellow, into a second set of three color data representing red, green and blue, or cyan, magenta, and yellow, said device comprising:

gray scale conversion means for converting the gray scale of said first set of three color data to produce a third set of three color data representing red, green and blue, or cyan, magenta, and yellow;

first calculation means for calculating a minimum value α and a maximum value β of said third set of three color data for each pixel;

hue data calculating means for calculating hue data r, g, b, y, m and c based on said third set of three color data, and said minimum and maximum values α and β outputted from said calculating means;

means for generating first comparison-result data based on the hue data outputted from said hue data calculating means;

means for generating second comparison-result data based on said first comparison-result data;

coefficient generating means for generating specified matrix coefficients for the hue data, the first comparison-result data and the second comparison-result data; and second calculation means responsive to said hue data, said first comparison-result data, said second comparison-result data, and the coefficients from said coefficient generating means for calculating said second set of three color data, said second calculation means performing calculation including matrix calculation performed at least on said hue data, said first comparison-result data, said second comparison-result data, and the coefficients from said coefficient generating means.

2. The color conversion device according to claim 1, wherein said second calculation means performs said matrix calculation on said hue data, said first comparison-result data, said second comparison-result data, and the coefficients from said coefficient generating means, and further includes synthesizing means for adding said minimum value α from said first calculation means to the results of said matrix calculation.

3. The color conversion device according to claim 2, wherein said coefficient generating means generates predetermined matrix coefficients Eij (i=1 to 3, j=1 to 3), and Fij (i=1 to 3, j=1 to 12), and said second calculation means performs the calculation using the hue data, said first comparison-result data, said second comparison-result data, said minimum value α from said calculating means, and said matrix coefficients to determine the second set of three color data representing red, green and blue, denoted by Ro, Go and Bo, in accordance with the following formula (1):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (1)$$

wherein h1r, h1g, h1b, h1c, h1m and h1y denote said first comparison-result data, and h2ry, h2rm, h2gy, h2gc, h2bm and h2bc denote said second comparison result data.

4. The color conversion device according to claim 2, wherein said coefficient generating means generates predetermined matrix coefficients Eij (i=1 to 3, j=1 to 3), and Fij (i=1 to 3, j=1 to 12), and said second calculation means performs the calculation using the hue data, said first comparison-result data, said second comparison-result data, said minimum value α from said calculating means, and said matrix coefficients to determine the second set of three color data representing cyan, magenta and yellow denoted by Co, Mo and Yo, in accordance with the following formula (2):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \end{bmatrix} + \begin{bmatrix} \alpha \\ \alpha \\ \alpha \end{bmatrix} \quad (2)$$

wherein h1r, h1g, h1b, h1c, h1m and h1y denote said first comparison-result data, and h2ry, h2rm, h2gy, h2gc, h2bm and h2bc denote said second comparison result data.

5. The color conversion device according to claim 1, wherein said second calculation means performs said matrix calculation on said hue data, said first comparison-result data, said second comparison-result data, the coefficients from said coefficient generating means, and said minimum value α from said first calculation means.

6. The color conversion device according to claim 5, wherein
said coefficient generating means generates predetermined matrix coefficients Eij (i=1 to 3, j=1 to 3), and Fij (i=1 to 3, j=1 to 13), and
said second calculation means performs the calculation using the hue data, said first comparison-result data, said second comparison-result data, said minimum value α from said calculating means, and said matrix coefficients to determine the second set of three color data representing red, green and blue, denoted by Ro, Go and Bo, in accordance with the following formula (3):

$$\begin{bmatrix} Ro \\ Go \\ Bo \end{bmatrix} = (Eij) \begin{bmatrix} r \\ g \\ b \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (3)$$

wherein h1r, h1g, h1b, h1c, h1m and h1y denote said first comparison-result data, and h2ry, h2rm, h2gy, h2gc, h2bm and h2bc denote said second comparison result data.

7. The color conversion device according to claim 5, wherein
said coefficient generating means generates predetermined matrix coefficients Eij (i=1 to 3, j=1 to 3), and Fij (i=1 to 3, j=1 to 13), and
said second calculation means performs the calculation using the hue data, said first comparison-result data, said second comparison-result data, said minimum value α from said calculating means, and said matrix coefficients to determine the second set of three color data representing cyan, magenta and yellow denoted by Co, Mo and Yo, in accordance with the following formula (4):

$$\begin{bmatrix} Co \\ Mo \\ Yo \end{bmatrix} = (Eij) \begin{bmatrix} c \\ m \\ y \end{bmatrix} + (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (4)$$

wherein h1r, h1g, h1b, h1c, h1m and h1y denote said first comparison-result data, and h2ry, h2rm, h2gy, h2gc, h2bm and h2bc denote said second comparison result data.

8. The color conversion device according to claim 1, wherein
said third set of three color data represent red, green and blue,
said second set of three color data represent red, green and blue, and
said hue data calculation means calculates the hue data r, g, b, y, m, c by subtraction in accordance with:

$r=Ri-\alpha$, $g=Gi-\alpha$, $b=Bi-\alpha$, $y=\beta-Bi$, $m=\beta-Gi$, and $c=\beta-Ri$, wherein Ri, Gi and Bi represent said third set of three color data.

9. The color conversion device according to claim 1, wherein
said third set of three color data represent cyan, magenta and yellow,
said second set of three color data represent red, green and blue,
said device further comprises means for determining complement of said third set of three color data, and
said hue data calculation means calculates the hue data r, g, b, y, m, c-by subtraction in accordance with:

$r=Ri-\alpha$, $g=Gi-\alpha$, $b=Bi-\alpha$, $y=\beta-Bi$, $m=\beta-Gi$, and $c=\beta-Ri$, wherein Ri, Gi and Bi represent data produced by the determination of the complement of said third set of three color data.

10. The color conversion device according to claim 1, wherein
said third set of three color data represent cyan, magenta and yellow,
said second set of three color data represent cyan, magenta and yellow, and
said hue data calculation means calculates the hue data r, g, b, y, m, c by subtraction in accordance with:

$r=\beta-Ci$, $g=\beta-Mi$, $b=\beta-Yi$, $y=Yi-\alpha$, $m=Mi-\alpha$, $c=Ci-\alpha$, wherein Ci, Mi and Yi represent said third set of three color data.

11. The color conversion device according to claim 1, wherein said third set of three color data represent red, green and blue, said second set of three color data represent cyan, magenta and yellow, said device further comprises means for determining complement of said third set of three color data, and said hue data calculation means calculates the hue data r, g, b, y, m, c by subtraction in accordance with:

$r = \beta - Ci,$ $g = \beta - Mi,$ $b = \beta - Yi,$ $y = Yi - \alpha,$ $m = Mi - \alpha,$ $c = Ci - \alpha,$ wherein Ci, Mi and Yi represent data produced by the determination of the complement of said third set of three color data.

12. The color conversion device according to claim 1, wherein said first comparison-result data generating means determines the comparison-result data among the hue data r, g and b, and the comparison-result data among the hue data y, m and c, and said second comparison-result data generating means comprises multiplying means for multiplying the first comparison-result data outputted from said first comparison-result data generating means with specific calculation coefficients, and means for determining the comparison-result data based on the outputs of said multiplication means.

13. The color conversion device according to claim 12, wherein said first comparison-result data generating means determines the first comparison-result data:

$h1r = \min(m, y),$ $h1g = \min(y, c),$ $h1b = \min(c, m),$ $h1c = \min(g, b),$ $h1m = \min(b, r),$ and $h1y = \min(r, g),$ (with min (A, B) representing the minimum value of A and B), and said second comparison-result data generating means determines the second comparison-result data:

$h2ry = \min(aq1*h1y, ap1*h1r),$ $h2rm = \min(aq2*h1m, ap2*h1r),$ $h2gy = \min(aq3*h1y, ap3*h1g),$ $h2gc = \min(aq4*h1c, ap4*h1g),$ $h2bm = \min(aq5*h1m, ap5*h1b),$ and $h2bc = \min(aq6*h1c, ap6*h1b),$ wherein aq1 to aq6 and ap1 to ap6 are the coefficients generated by the coefficient generating means.

14. The color conversion device according to claim 12, wherein said multiplying means in said second comparison-result data generating means performs calculation on said first comparison result-data and said calculation coefficients by setting said calculation coefficients aq1 to aq6 and ap1 to ap6 to integral values of $2^n$, with n being an integer, and by bit shifting.

15. The color conversion device according to claim 1, wherein each of said first comparison-result data is determined from two of the hue data and is effective for only one of the six hues of red, green, blue, cyan, magenta and yellow.

16. The color conversion device according to claim 1, wherein each of said second comparison-result data is determined from two of the first comparison-result data and is effective for only one of the six inter-hue areas of red-yellow, yellow-green, green-cyan, cyan-blue, blue-magenta, and magenta-red.

17. The color conversion device according to claim 1, wherein said coefficient generating means generates specified matrix coefficients Eij (i=1 to 3, j=1 to 3) based on a formula (5) below:

$$(Eij) = \begin{bmatrix} 1 & 0 & 0 \\ 0 & 1 & 0 \\ 0 & 0 & 1 \end{bmatrix} \quad (5)$$

18. The color conversion device according to claim 1, wherein said first calculation means calculates a maximum value $\beta$ and a minimum value $\alpha$ using said third set of three color data, and generates an identification code indicating the hue data which is of a value zero, and said coefficient generating means generates said matrix coefficients based on the identification code outputted from said first calculation means, and said second calculation means performs matrix calculation using the coefficient from said coefficient generating means to produce said second set of three color data based on the identification code outputted from said first calculation means.

19. The color conversion device according to claim 1, wherein the gray scale conversion means is utilized for linearization.

20. A color conversion method of performing pixel-by-pixel color conversion from a first set of three color data representing red, green and blue, or cyan, magenta and yellow, into a second set of three color data representing red, green and blue, or cyan, magenta, and yellow, said method comprising the steps of:

(a) converting the gray scale of the first set of three color data to produce a third set of three color data representing red, green and blue, or cyan, magenta and yellow;

(b) calculating a minimum value $\alpha$ and a maximum value $\beta$ of said third set of three color data for each pixel;

(c) calculating hue data r, g, b, y, m and c based on said third set of three color data, and said minimum and maximum values $\alpha$ and $\beta$ obtained at said step (b);

(d) generating first comparison-result data based on the hue data obtained at said step (c);

(e) generating second comparison-result data based on said first comparison-result data;

(f) generating specified matrix coefficients for the hue data, the first comparison-result data and the second comparison-result data; and (g) calculating, responsive to said hue data, said first comparison-result data, said second comparison-result data, and the coefficients generated at said step (f), said second set of three color data;

said step (g) comprising the step of performing matrix calculation on at least said hue data, said first comparison-result data, said second comparison-result data, and the coefficients obtained at said step (f).

21. A machine-readable recording medium that stores a computer program for implementing the method as set forth in claim 20.

22. The color conversion method according to claim 20, wherein the step of converting the gray scale is utilized for linearization.

* * * * *